Nov. 6, 1951  W. M. YOUNG ET AL  2,573,754
PRETZEL DOUGH EXTRUDING AND ROLLING MACHINE
Filed Oct. 28, 1944  12 Sheets-Sheet 1
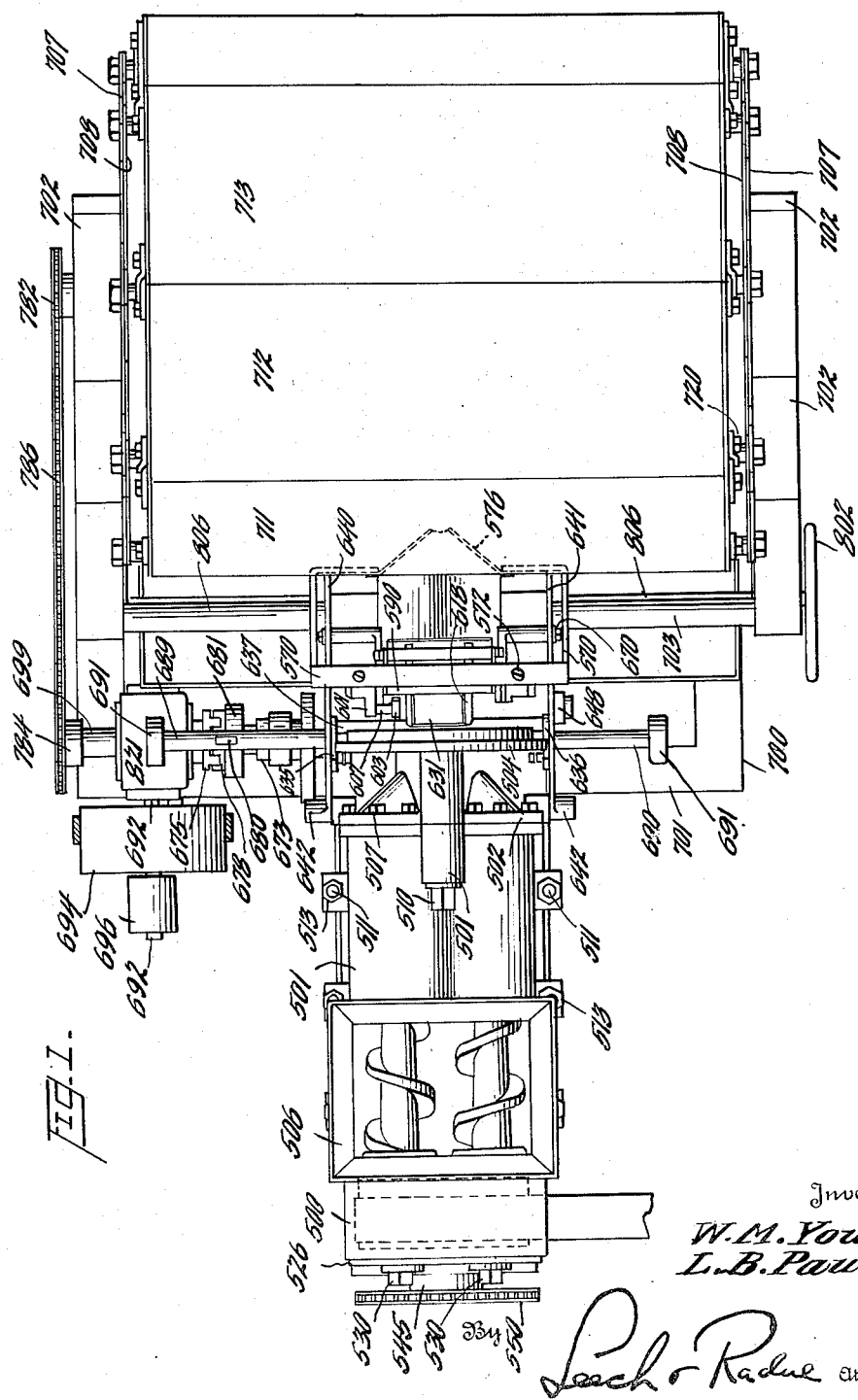
Inventors
W. M. Young
L. B. Paules
By Leach & Radue Attorneys

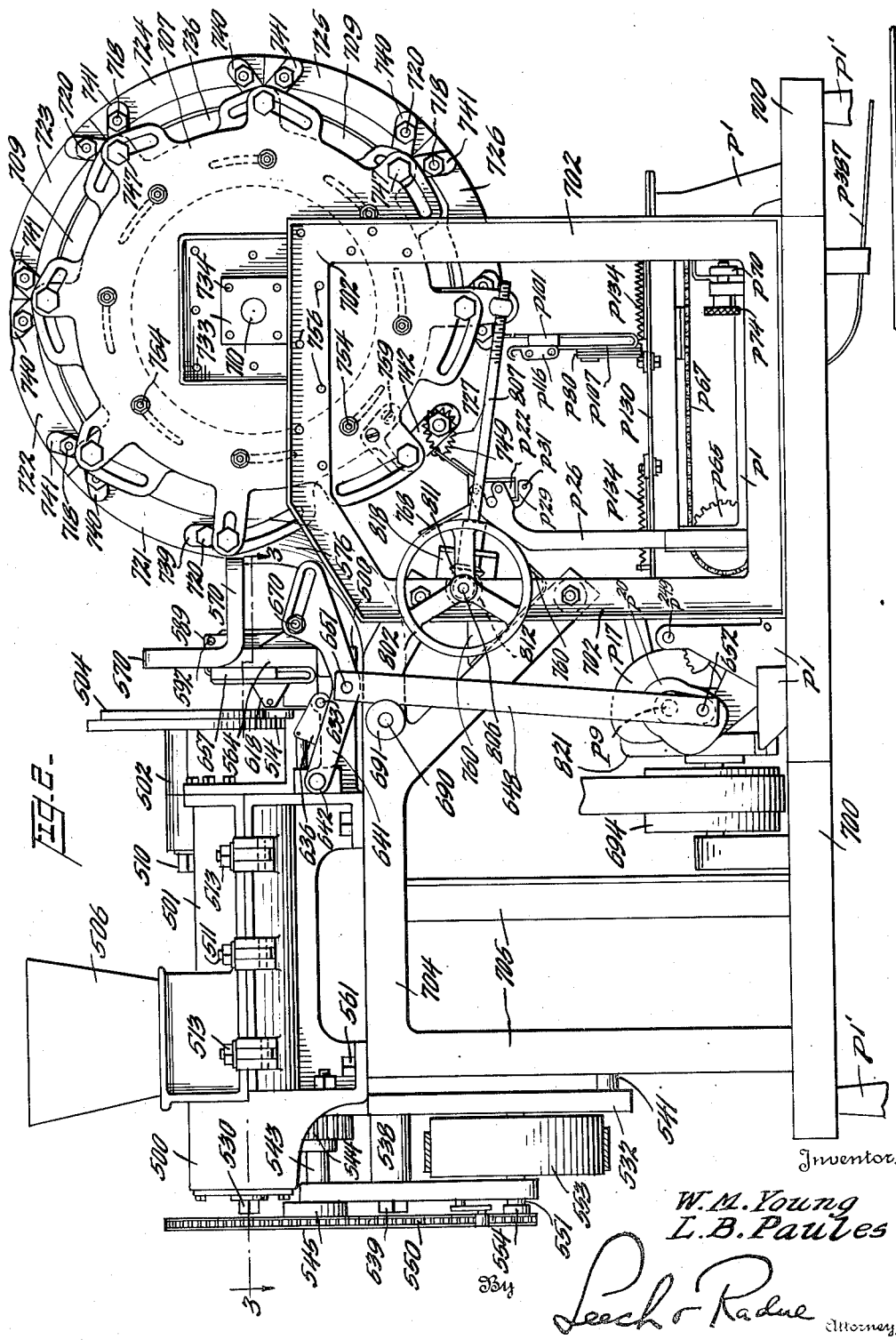

Nov. 6, 1951 W. M. YOUNG ET AL 2,573,754
PRETZEL DOUGH EXTRUDING AND ROLLING MACHINE
Filed Oct. 28, 1944 12 Sheets-Sheet 3
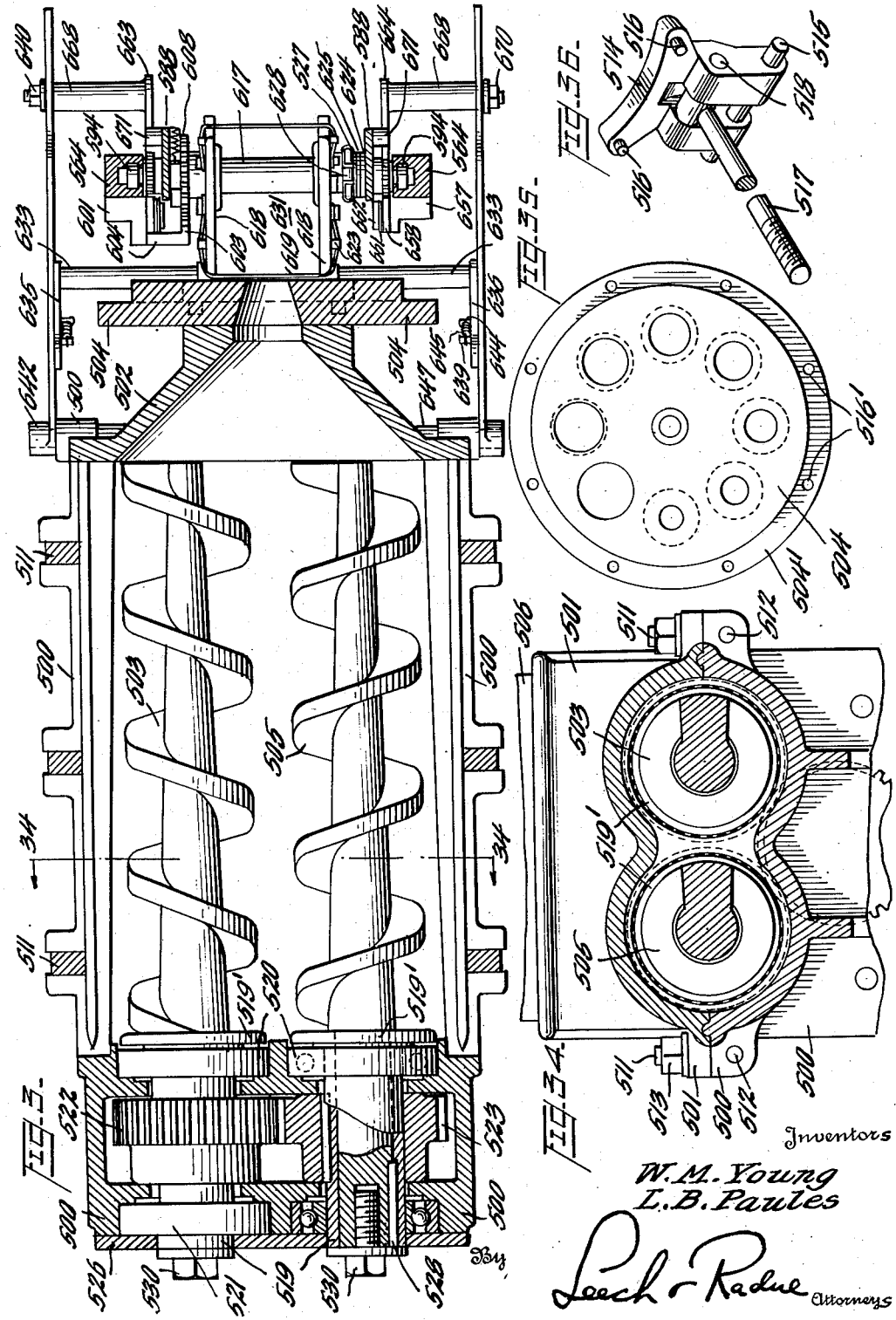
Inventors
W. M. Young
L. B. Paules
By Leech & Radue Attorneys

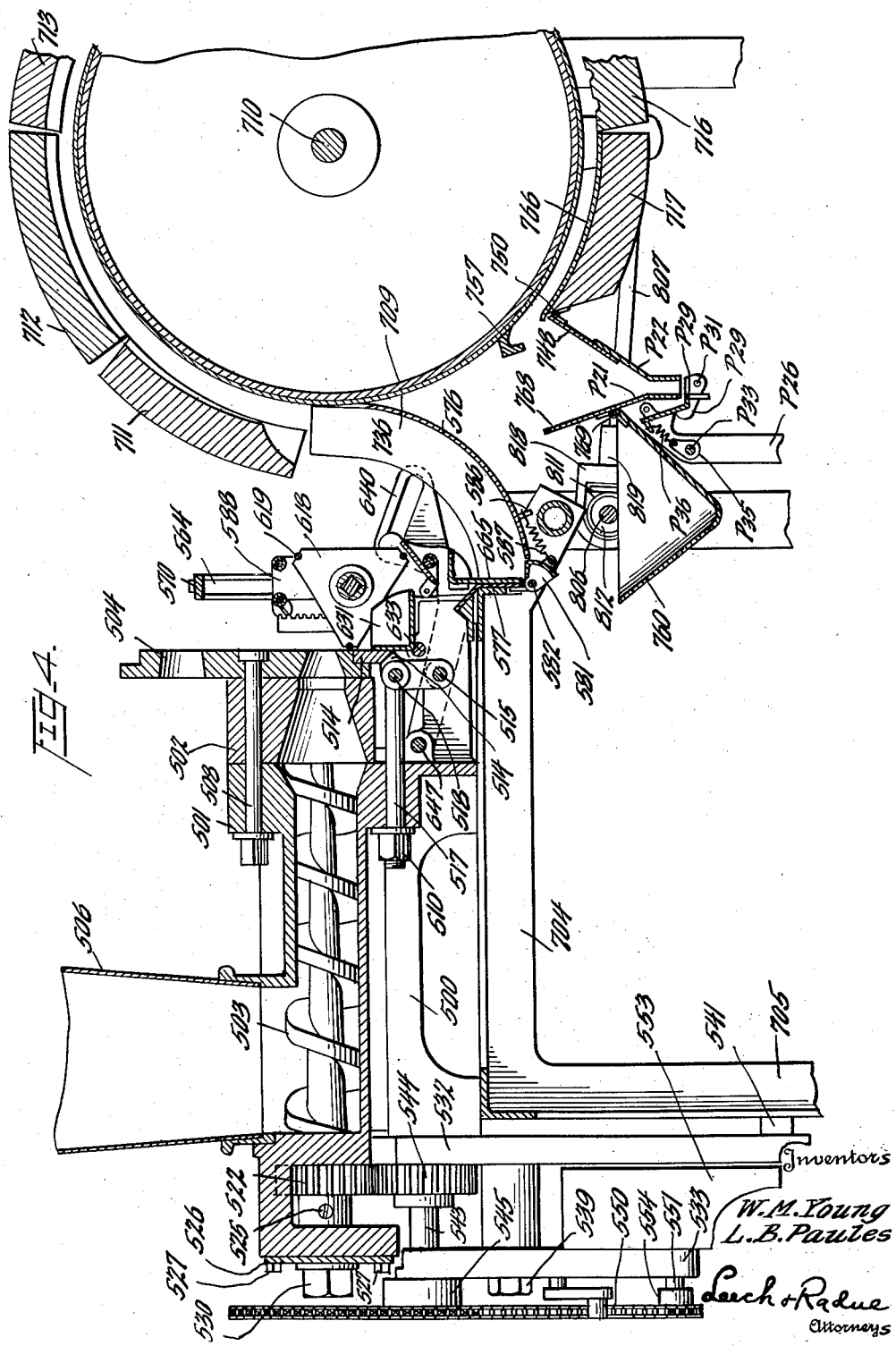

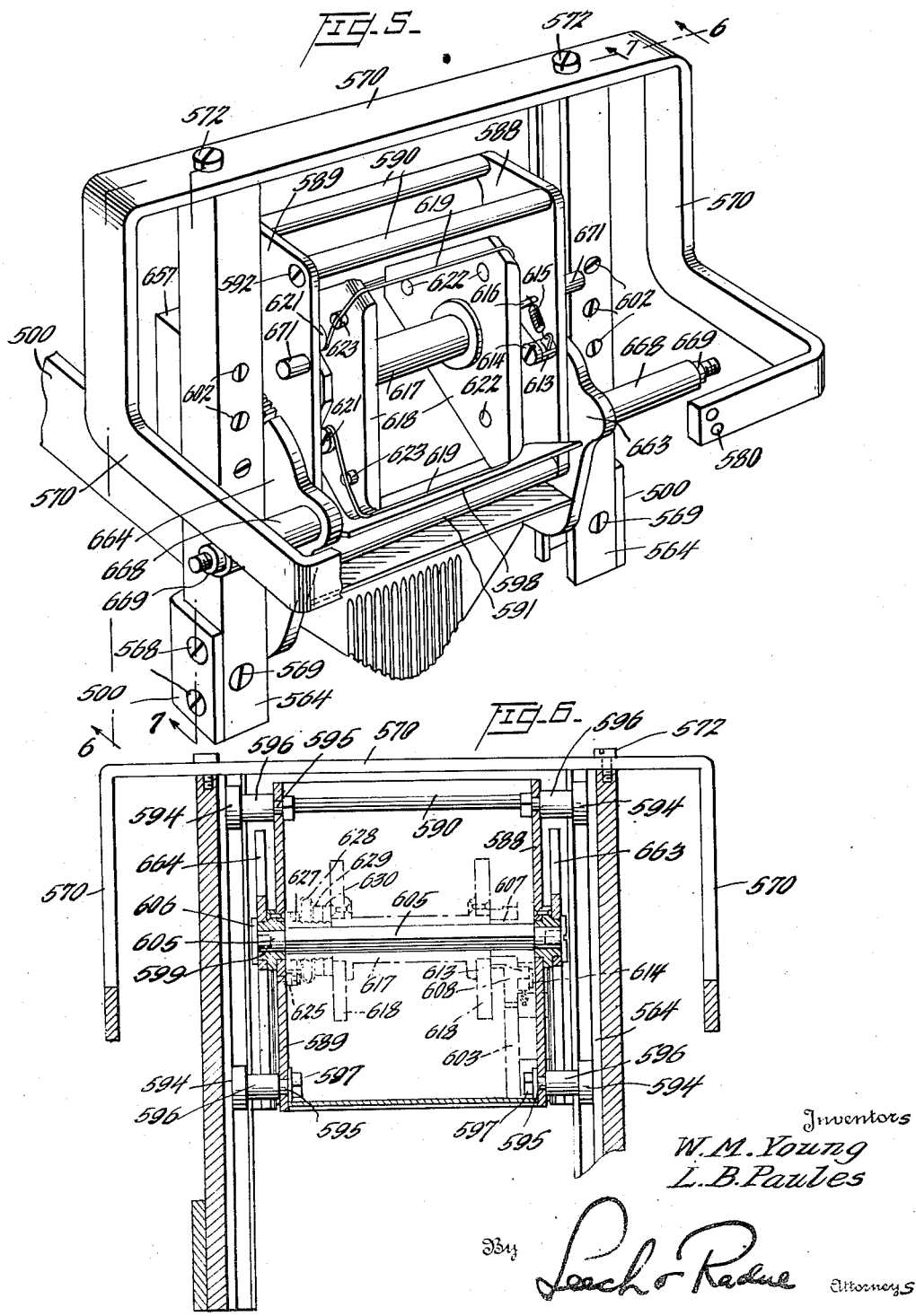

Nov. 6, 1951 W. M. YOUNG ET AL 2,573,754
PRETZEL DOUGH EXTRUDING AND ROLLING MACHINE
Filed Oct. 28, 1944 12 Sheets-Sheet 6
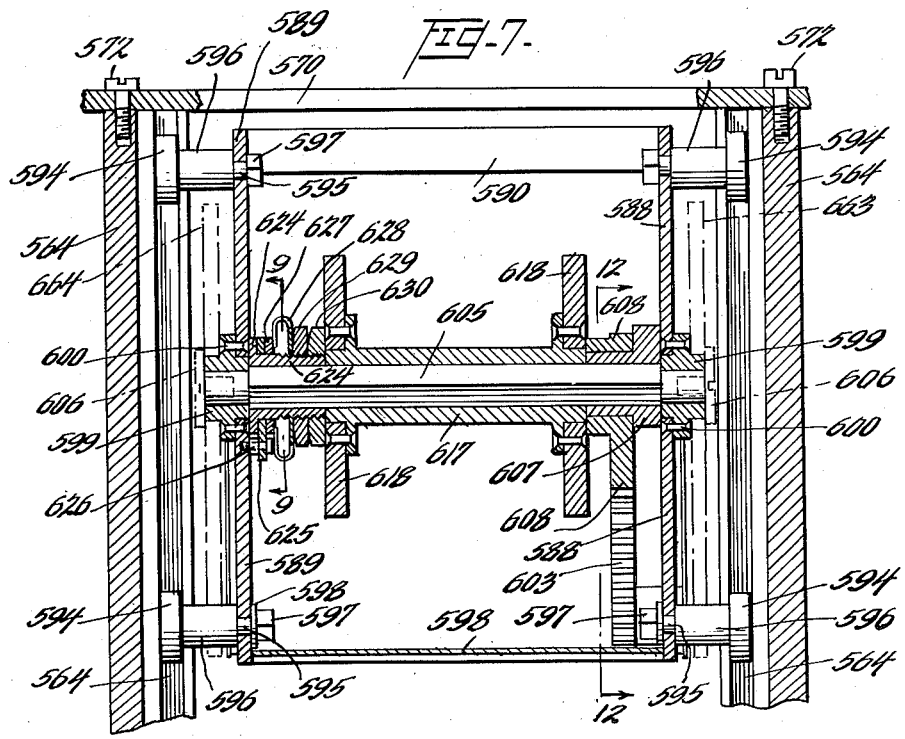
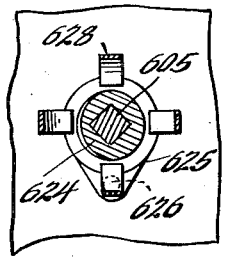
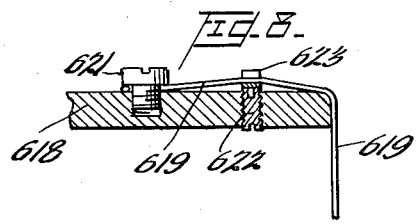
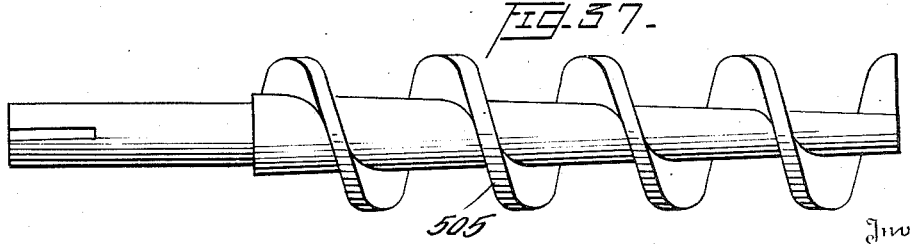
Inventors
W. M. Young
L. B. Paules
By Leech & Radue Attorneys

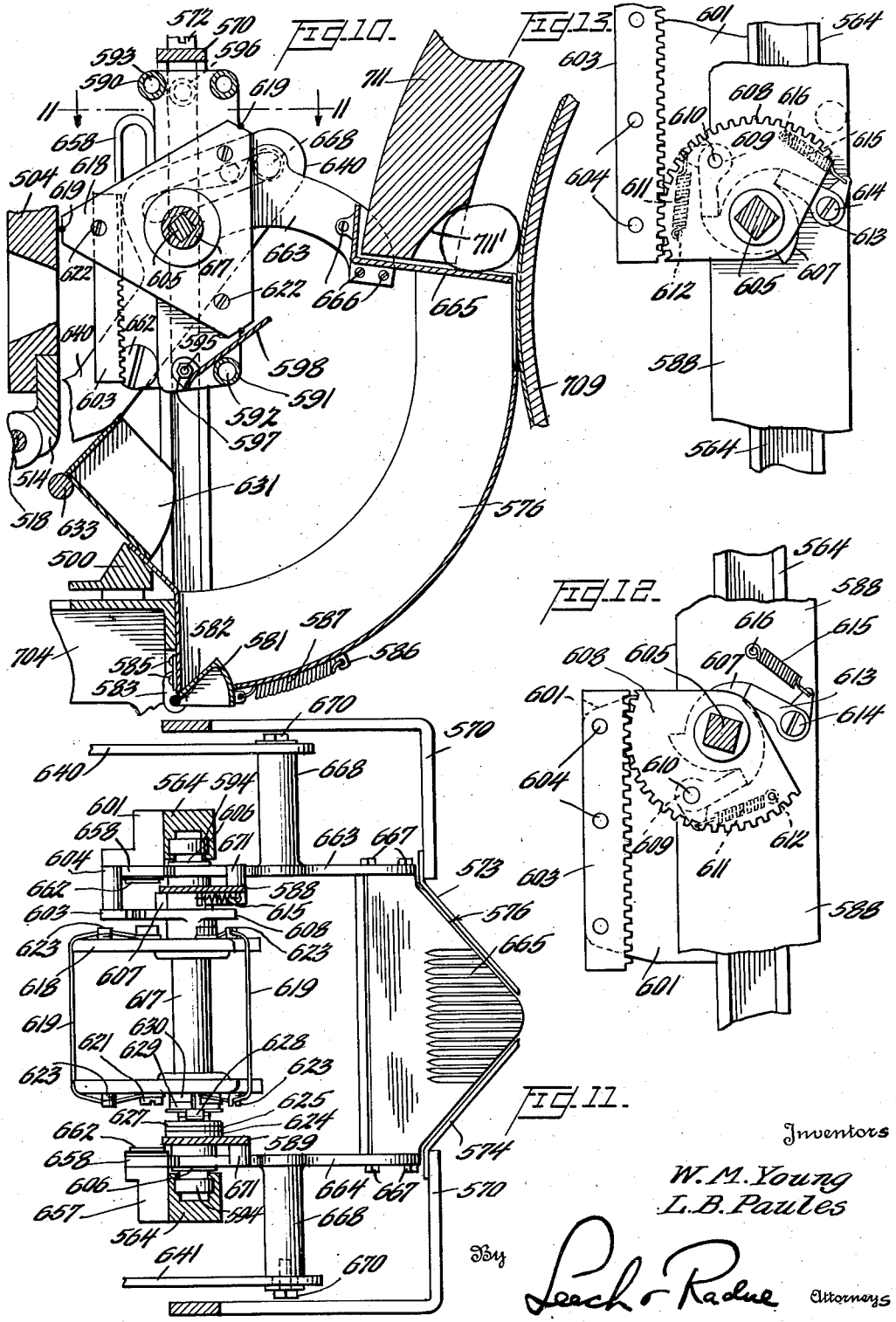

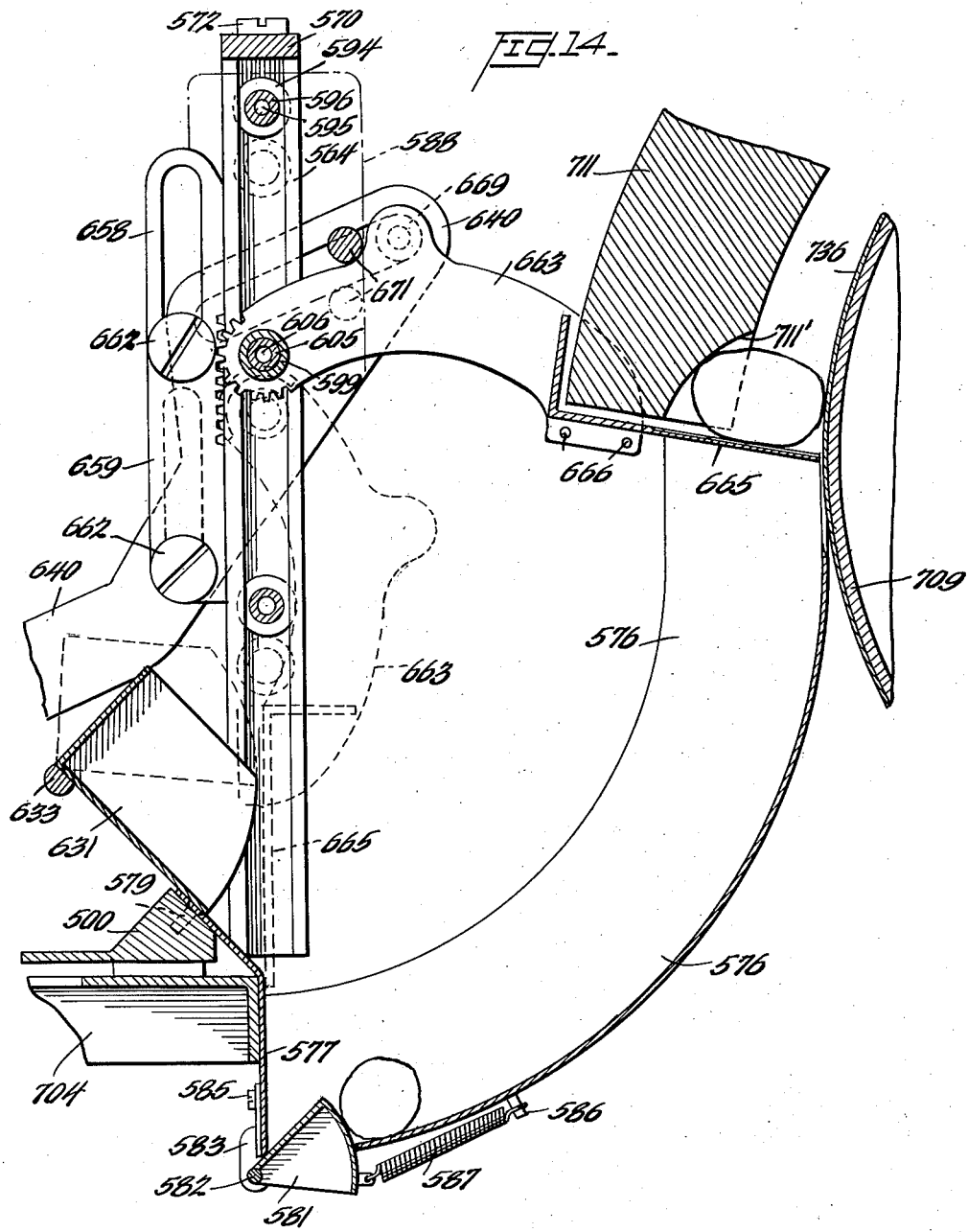

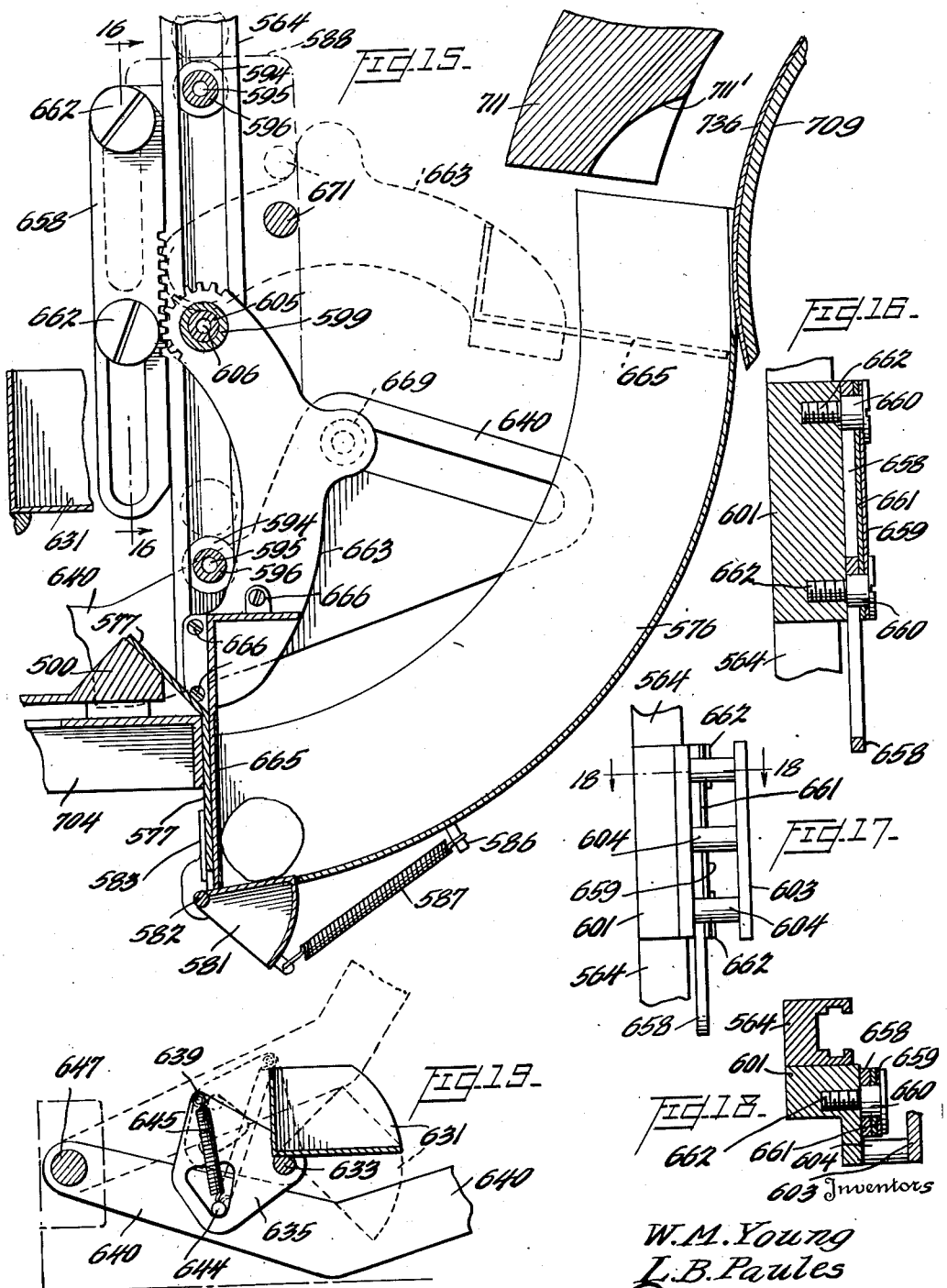

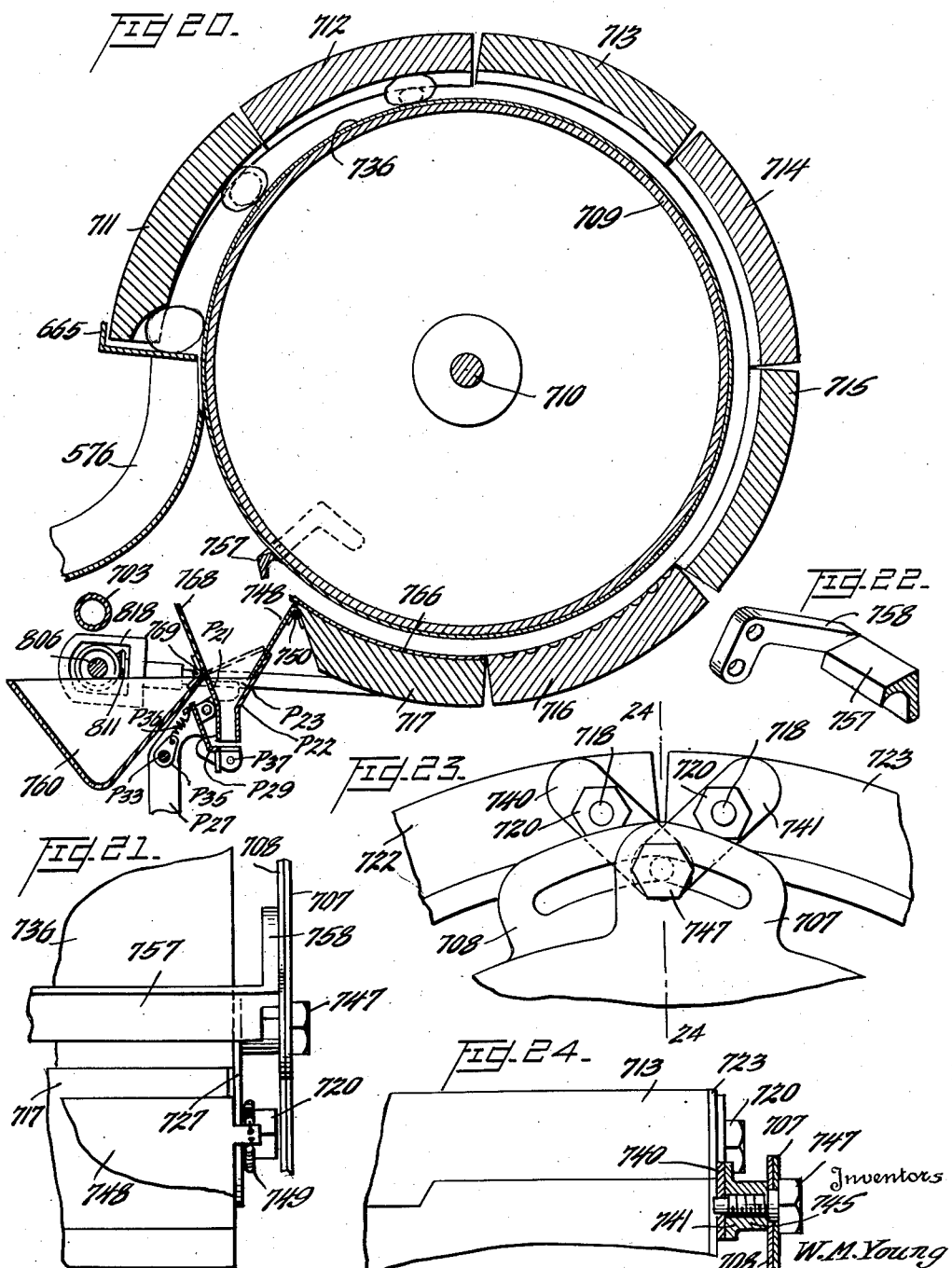

Nov. 6, 1951     W. M. YOUNG ET AL     2,573,754
PRETZEL DOUGH EXTRUDING AND ROLLING MACHINE
Filed Oct. 28, 1944     12 Sheets-Sheet 11
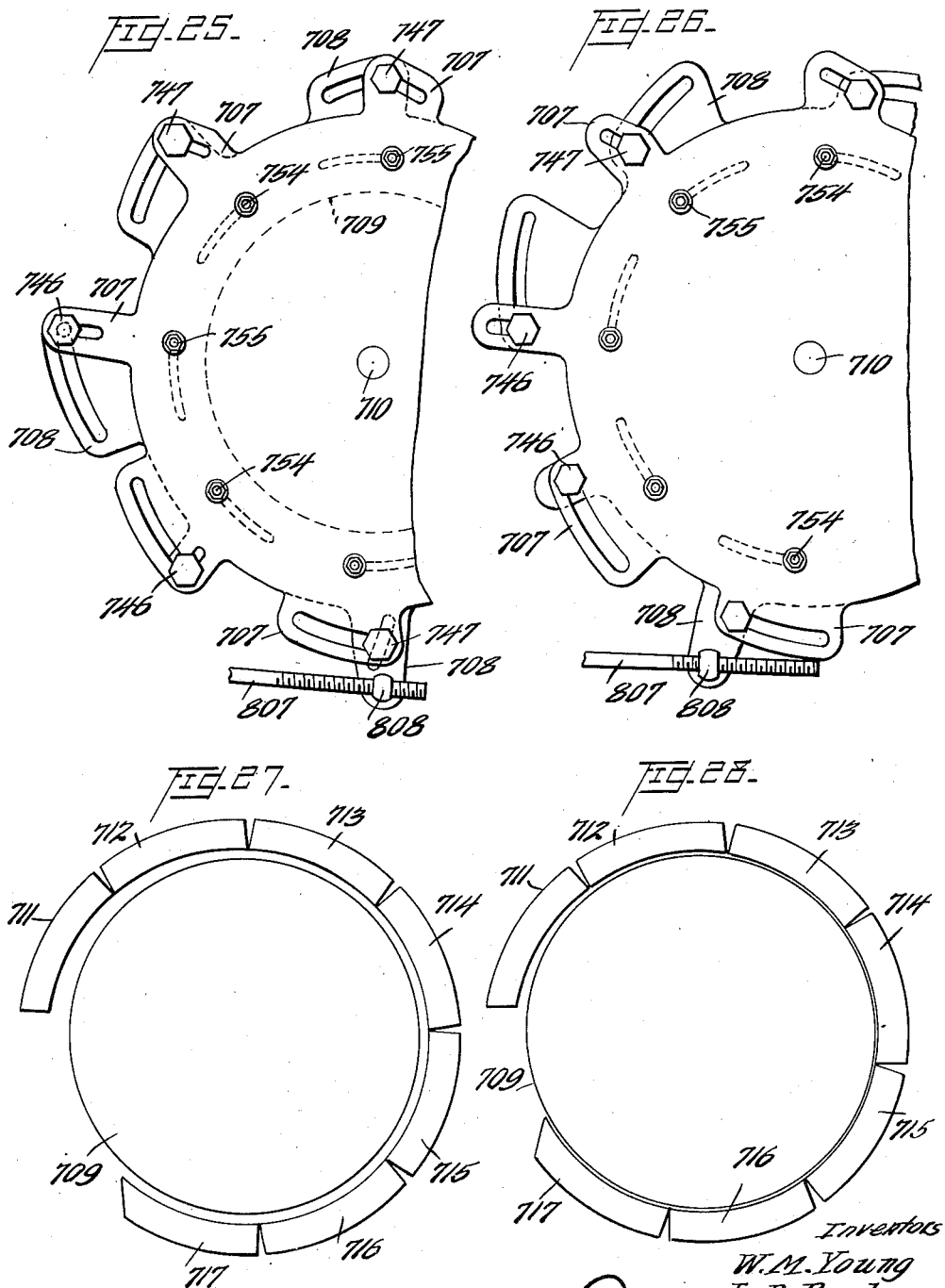

Nov. 6, 1951   W. M. YOUNG ET AL   2,573,754
PRETZEL DOUGH EXTRUDING AND ROLLING MACHINE
Filed Oct. 28, 1944   12 Sheets-Sheet 12
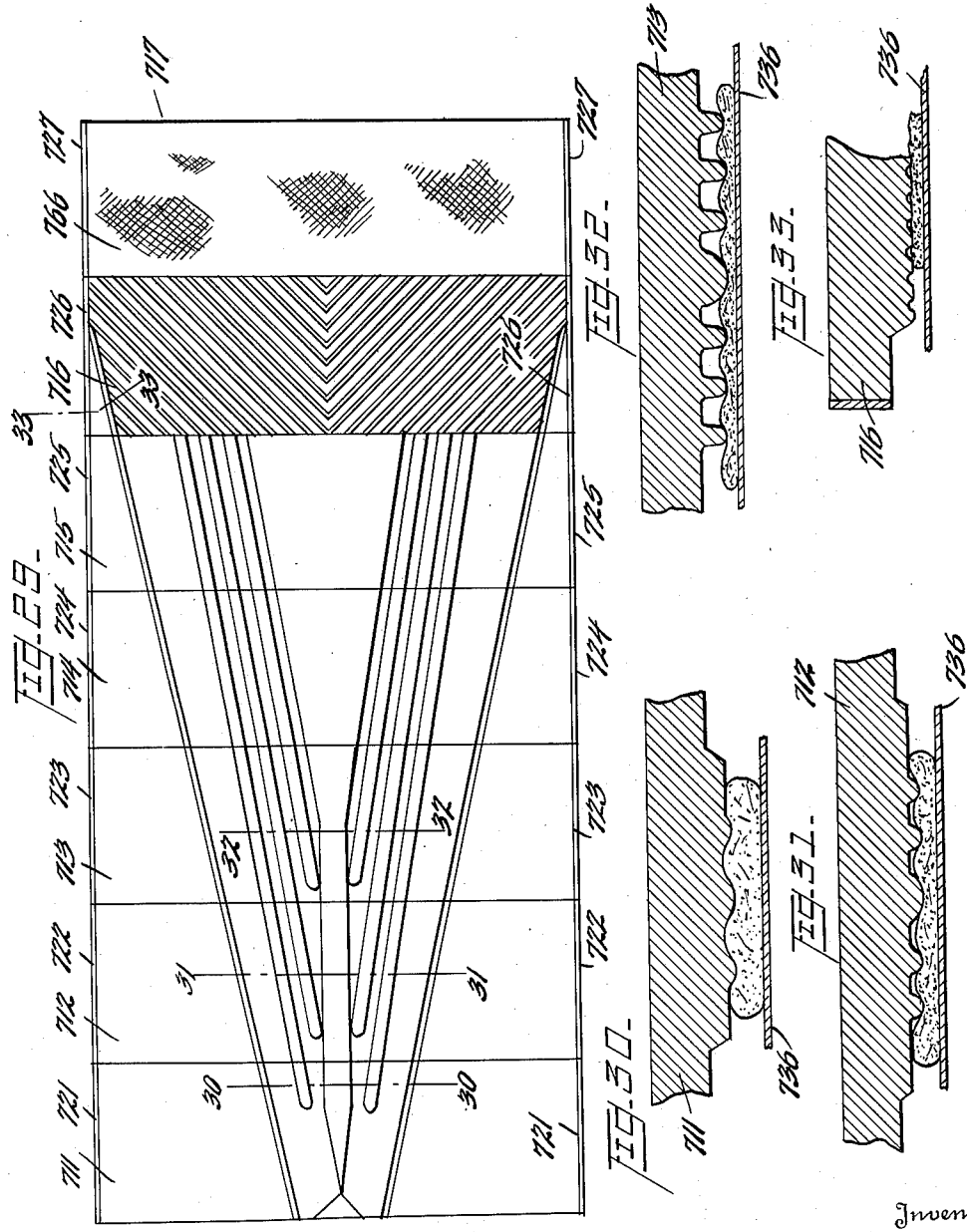
Inventors
W. M. Young
L. B. Paules
By Leech & Radue Attorneys

UNITED STATES PATENT OFFICE 2,573,754

PRETZEL DOUGH EXTRUDING AND ROLLING MACHINE

William M. Young and Lemon Blair Paules, Harrisburg, Pa.

Application October 28, 1944, Serial No. 560,852

10 Claims. (Cl. 107—13)

This invention relates to pretzel making machines, and particularly to an improved unitary machine which will receive a batch of dough, knead and extrude it continuously through one of a plurality of orifices of various diameters, sever the dough into lumps of predetermined lengths, and roll the dough into the required sizes and shapes necessary for the final step of bending and twisting it into pretzel shape.

The pretzel making machines which have been designed in the past have certain inferior and unreliable characteristics which make them unsatisfactory in use. These undesirable characteristics include, among others: poor coordination of the dough rod producing elements with respect to the twisting and folding elements; serious limitations in the diameters and lengths of dough rods which can be produced as well as in their texture; and bulky and unwieldy apparatus having extremely limited adjusting features which result in the production of dough rods not having the proper sizes and shapes required for the making of pretzels.

The above conditions compelled the manual pretzel twisters and folders to waste time selecting only those dough rods that were suitable to be used, and, before proceeding with the manual twisting and folding operation, to lengthen the dough rod by stretching it to the desired length. This resulted in a porous surface finish of the dough rod which was detrimental to the production of a high class pretzel product. The principal reason for rolling the lump of dough, aside from obtaining the proper rod shape, is to produce a non-porous finish, which gives a smooth finish to the finished product, and, most important, closes the pores of the dough, preventing an over absorption of the dipping solution used for browning. It is just as important that this smooth finish is not in any way destroyed after being attained by the action of the extruding and rolling elements.

In the preparation of pretzel dough, the ingredients, which may be flour, sugar, salt, shortening, yeast, water, etc., are properly proportioned and placed in a mixing machine, better known to the baking industry as a dough mixer or mangle. This type of machine is responsible for the proper mixing and kneading of the ingredients into a mass of dough of a consistency suitable for the manufacture and further processing of pretzels. The mass of dough obtained from this mixing and kneading operation is at the stage of processing suitable for feeding to the machine comprising the present invention and its various operations of extruding, severing, feeding, rolling, twisting, and folding into pretzels.

The chief object of the present invention is to provide an improved pretzel forming apparatus which will eliminate the objectionable features now inherent in apparatus of this type and which will deliver prefectly formed pretzels at a maximum rate by a series of coordinated forming operations.

A further object of the invention is to provide a pretzel forming apparatus which will be completely automatic in operation from the time of feeding the dough thereto until the completely formed pretzel is delivered therefrom.

A further object is to provide a pretzel forming apparatus in which the various elements are so synchronized that a single rotation of the driving shaft of a single source of power affects the extruding and cutting of a lump of dough, the feeding of another preceding lump of dough, and the twisting and folding of a dough rod into a pretzel, while a second rotation completes the rolling of a lump of dough into a rod of predetermined diameter and length.

A still further object of the invention is to provide a pretzel forming apparatus having means for adjusting its various parts whereby a maximum number of perfectly formed pretzels of various sizes may be continuously produced.

Another object is to provide a simple, relatively compact structure easy of manufacture and maintenance, and particularly well designed for an easy removal of parts to facilitate the cleaning thereof.

Another object is to provide a pretzel forming apparatus including dough-receiving, extruding, cutting, feeding, rolling, and twisting and forming elements all of which include novel parts and arrangements thereof whereby improved pretzels completely free from the deleterious effects of prior apparatus are continuously produced in various sizes and at a maximum rate of production.

Other objects and advantages of the invention will become apparent during the course of the following description.

Briefly stated, our invention provides a pretzel making machine which is designed to receive a mass of dough from a mixing machine, and, through a pair of oppositely rotating cooperating tapered screws, feed or convey the dough into a tapering chamber and extrude it continuously therefrom through one of several orifices of various diameters. As the dough is continuously extruded or expelled from the selected orifice an intermittently rotating wire cutter severs the dough into lumps of predetermined lengths, size, and weight as required for the making of a single type of pretzel. The severed lump of dough falls into a small box-like receptacle, having a co-ordinated mechanical action which transfers and discharges it onto the bottom of a curved trough in readiness for its transfer to the rolling elements. A feeding platform also having a co-ordinated mechanical action automatically positions itself at the rear side of the lump of dough and, by a pushing and lifting movement conforming in direction to the curved shape of the feeding trough, feeds the lump to the rolling elements. These comprise a rolling cylinder and a series of hingedly connected segments having a substantially continuous inner surface which is spaced from the surface of the cylinder.

As the dough is rolled, pressure is increased between these surfaces by a novel arrangement of parts until the proper diameter of the dough rod is obtained. The space between the segments and the rolling cylinder is adjustable to the sizes or diameters of dough rods desired. The segments do not move while the dough is being rolled, and the rotating cylinder is responsible for movement of the dough in its rolling action, while passing between the rolling elements. When the small lumps of dough are fed to the rolling elements, they contact the rotating cylinder and are drawn into the space between the segments and the cylinder where they are rolled, pressed and kneaded into the conformation of dough rods.

The rolling surfaces of the curved segments are provided with a series of corrugations which are responsible for the proper lateral distribution of the dough in order to form the required length of the dough rod while being rolled. The curved segments form an arc of substantially 315 degrees. The small lumps of dough commence their rolling operation at one end of the curved segments, and roll throughout the length of the arc at which point the finished dough rods are ejected from the rolling units. Suitable means in the form of a hopper receives the finished dough rods as they are ejected from the rolling elements and delivers them to the twisting and folding elements.

Suitable safety means are provided in the present invention whereby it is impossible for the various parts of our machine to "get out of time" or bind, so that the machine acts with precision and so co-ordinated in its functions that it is largely fool proof in its operation.

In the drawings wherein we have disclosed one embodiment of our invention:

Fig. 1 is a plan view of the complete pretzel making apparatus with some parts omitted for clarification.

Fig. 2 is a view in elevation of the left side of the machine with some parts omitted for clarification.

Fig. 3 is a horizontal sectional view taken on the line 3—3 of Fig. 2, parts being shown in plan.

Fig. 4 is a fragmentary central vertical sectional view of the apparatus, some parts being omitted for clarification.

Fig. 5 is a perspective view of the dough severing and feeding mechanism at the commencement of the severing and feeding operations.

Fig. 6 is a transverse vertical sectional view taken on the line 6—6 of Fig. 5 showing the dough severing and feeding mechanism, part of the severing mechanism being omitted for clarification.

Fig. 7 is a transverse vertical sectional view to an enlarged scale taken on the line 7—7 of Fig. 5 showing the dough severing and feeding mechanism, part of the feeding mechanism being omitted for clarification.

Fig. 8 is an enlarged fragmentary detail view in cross section of the means for mounting and tensioning one of the several wires on the dough cutter.

Fig. 9 is a vertical sectional view taken on the line 9—9 of Fig. 7 showing one of the parts of the apparatus.

Fig. 10 is an enlarged central vertical sectional view, parts being shown in elevation, of the dough severing and feeding means, some parts being omitted for clarification. The feeding mechanism is shown at the completion of its cycle having delivered a lump of dough to the rolling unit, and the severing mechanism is at the commencement of its cycle.

Fig. 11 is a horizontal sectional view taken on the line 11—11 of Fig. 10 showing the severing and feeding mechanism, parts being shown in plan.

Fig. 12 is an enlarged view in elevation taken on the line 12—12 of Fig. 7 of the mechanism for intermittently rotating the dough cutter which is shown at the commencement of its cycle, some of the parts being omitted for clarity.

Fig. 13 is a view similar to Fig. 12, the parts being shown at the completion of the severing cycle, some of the parts being omitted for clarity.

Fig. 14 is an enlarged central vertical sectional view, parts being shown in elevation, of the dough lump feeding mechanism at the completion of the feeding cycle.

Fig. 15 is an enlarged central vertical sectional view, parts being shown in elevation, of the dough lump feeding mechanism at the commencement of its cycle.

Fig. 16 is an enlarged vertical sectional view taken on the line 16—16 of Fig. 15, showing one of two frictional resistance elements which co-operate with elements of the feeding mechanism.

Fig. 17 is an enlarged rear elevation of the assembly and construction of the frictional brake means for synchronizing the movement of the feeding mechanism with the intermittent rotation of the dough cutter.

Fig. 18 is an enlarged horizontal sectional view taken on the line 18—18 of Fig. 17.

Fig. 19 is a central vertical sectional view, parts being shown in elevation, of the oscillating means for the receptacle for the severed dough lumps.

Fig. 20 is a central vertical sectional view, parts being shown in elevation, as seen from the left side of the dough rod rolling apparatus and associated parts, some of the parts being omitted for clarity.

Fig. 21 is an enlarged fragmentary transverse rear elevation of the assembly provided for the ejection and guiding of the rolled rods of dough from the rolling apparatus.

Fig. 22 is a perspective fragmentary view of the means for ejecting the rolled rods of dough from the rolling apparatus.

Fig. 23 is an enlarged fragmentary elevational view of the left side of the rolling apparatus illustrating the method of construction and assembly of the rolling segments to the side members of the rolling apparatus.

Fig. 24 is a fragmentary transverse sectional view taken on the line 24—24 of Fig. 23, parts being shown in elevation.

Fig. 25 is a view in elevation of the left side of parts of the rolling apparatus, showing the relative positions of the rolling segment adjustment plates to the rolling apparatus side plates when adjusted for the rolling of the larger sizes of dough rods, some parts being omitted for clarity.

Fig. 26 is a view similar to Fig. 25, the rolling apparatus being adjusted for the rolling of the smaller sizes of dough rods, some parts being omitted for clarity.

Fig. 27 is a view in elevation of the left side of the rolling segments and rolling cylinder, showing their relative positions when the rolling segments are adjusted to roll the larger sizes of dough rods, some parts being omitted for clarity. The positions of the segments correspond to the adjustment illustrated in Fig. 25.

Fig. 28 is a view in elevation of the left side of the rolling segments and rolling cylinder, showing their relative positions when the rolling segments are adjusted to roll the smaller sizes of dough rods, some parts being omitted for clarity. The positions of the segments correspond to the adjustment illustrated in Fig. 26.

Fig. 29 is a plan view of the inner surface of the rolling segments which provide one of the two surfaces which cooperate to roll the lumps of dough into rods.

Fig. 30 is a fragmentary transverse sectional view of a rolling segment taken on the line 30—30 of Fig. 29, showing its relationship to the rolling cylinder, and a lump of dough being rolled.

Fig. 31 is a fragmentary transverse sectional view of a rolling segment taken on the line 31—31 of Fig. 29.

Fig. 32 is a fragmentary transverse sectional view of a rolling segment taken on the line 32—32 of Fig. 29.

Fig. 33 is a fragmentary transverse sectional view of a rolling unit segment taken upon the line 33—33 of Fig. 29.

Fig. 34 is a transverse sectional view, taken on the line 34—34 of Fig. 3, parts being shown in elevation, showing the extruding screws and hopper chamber.

Fig. 35 is a front elevation of the orifice plate having a plurality of tapered apertures graduated as to size.

Fig. 36 is an enlarged perspective view of the construction of the indexing means for aligning and clamping the orifice plate during the operation of the apparatus; and Fig. 37 is a plan view of one of the two tapered screws provided for the feeding and extruding of the mass of dough through the hopper chamber.

Referring now to the drawings it is to be understood that, as seen in Fig. 1, the portion of the apparatus at the base of the drawing is considered the rear thereof, and the opposite side or rolling elements constitute the front of the apparatus. As further seen in Fig. 1, the left side of the drawing is to be understood as the right side of the machine and the right side of the drawing is to be considered as the left side of the machine.

The apparatus is provided with a sectional base or frame made up of a number of structural sections including side sections 700 connected laterally by structural members 701 all of which form together a rigid supporting platform for the various units of the apparatus. The platform is provided at each of its corners with legs P1 to permit completely formed pretzels to be delivered from the twisting and folding elements to a conveyor, etc. by means of the chute P387.

The pretzel twisting and folding elements are mounted on the structural sections forming the front of the supporting platform, the dough rod rolling elements being suitably supported directly above the twisting and folding elements, and the extruding, severing, and feeding elements are positioned directly to the rear of the rolling elements. The supporting platform is provided, adjacent the front section, with vertically and horizontally extending structural members 702 which are suitably connected by lateral frame members 703 to form a rigid supporting frame structure for the rolling elements. To the rear of the rolling element supporting frame 702—703, horizontal structural members 704 are provided which, together with supporting structural leg members 705, form the supporting frame for the extruding, severing, and feeding elements. It will be noted (Figs. 1, 2 and 4) that the supporting platform comprising the structural members 700 and 701 and the supporting frames composed of the horizontally extending structural members 703 and 704, together with the structural leg members 702 and 705, all being rigidly bolted or otherwise secured together, form a very substantial platform and supporting frame member for all the various elements of the pretzel making machine.

Referring now to Figs. 1–4, 34—37 and with particular reference to Figures 2–4 and 34, the numeral 500 designates the base or lower half of an internally tapering extruding chamber which is suitably bolted as at 561 to the frame member 704. The extruding chamber 500 is formed or cast to include at its rear end a combined bearing and gear housing section which has at its front end a pair of ball bearings 520 and at its rear end a pair of ball bearings 521.

The rear pair of ball bearings 521 are suitably retained in place by a bearing plate 526. Insertable from the front of the gear chamber through the front bearings 520 so as to extend through the gear chamber and the rear bearings 521 are a pair of flanged driving sleeves 519. The front bearings 520 being adjacent to the dough receiving portion of the extruding chamber 500 are provided with a pair of protective shields 519' mounted on sleeves 519 to prevent the entrance of dough within the gear chamber. These sleeves are rotatable in the front and rear bearings 520 and 521 and are suitably keyed to the shanks of a pair of feed screws 503 and 505 which are provided respectively with left and right hand spiral threads. The shank ends of the feed screws 503 and 505 are of the same length and extend through the sleeves 519 and are provided in their ends with threaded holes for the reception of a pair of cap screws 530. These bear against the sleeves 519 and together with the shields 519' retain the feed screws in proper position.

A pair of mating gears 522 and 523 are assembled and suitably keyed as shown on the sleeves 519 and together retain the sleeves 519 in their proper axial positions.

The extruding chamber 500 is provided with a top or closing section 501 which includes a part of a hopper section which in turn has an upper portion 506 suitably mounted thereon. In order that the upper section 501 may be readily removed from the lower section 500, a number of slotted lugs are provided at regular intervals along the extruding chamber cover 501 to cooperate with a similar number of swing bolts 511 pivotally secured to the extruding chamber 500 to maintain both sections of the extruding chamber tightly together. When it is desired to clean the extruding chamber, it is obvious that the two sections 500 and 501 may readily be separated by loosening the nuts 513 on the bolts 511, swinging the bolts downwardly out of the slotted lugs provided in the section 501 so that the cover may be readily removed from its position. To insure that no dough is permitted to leak during operation the top edge surfaces of section 500 are provided with a continuous bead (Fig. 34) which cooperate with a groove provided in the bottom edge surfaces of the section 501 so that tightening of the nuts on the swing bolts 511 provides a perfectly sealed and leak-proof joint between the two halves of the extruding chamber.

It will be noted (Fig. 34) that the top and bottom sections of the extruding chamber together form a twin pair of cylinders which are so tapered toward the front end of the chamber as to fully cooperate with the tapered spiral threads of the feed screws 503 and 505.

A tapered section or casing 502 having a front discharge opening is positioned adjacent the front end of the extruding chamber and is suitably secured thereto. The top of the section 502 is so shaped and drilled as to receive a bolt 508 bearing the tightening nut 510. A circular plate 504 is pivotally mounted against the opening of the tapered section 502 by means of the bolt 508 and is provided with a plurality of extruding apertures of equal rear diameter but which have different degrees of taper toward the front of the apparatus. The mounting of the circular plate 504 on the bolt 508 is so arranged that the extruding apertures of the plate which have varying front diameters may be positioned in exact alignment with the opening of the tapered section 502. Thus as rear diameters of the various apertures in the plate 504 are identical in size with the opening in the tapered section 502 while the front diameters, due to varying tapers vary progressively in size as desired, various diameters of material may be smoothly and efficiently extruded from the chamber 500, 501, 502.

The circular plate 504 may be rotated about its mounting bolt 508 so as to bring into alignment any of the various sized tapered extruding apertures therein with the opening in the tapered section 502. The front external surface adjacent the latter opening and the rear surfaces of the openings in the circular plate 504 are very highly machined so that a very closely fitting and non-leakable connection is provided, no matter what size extruding aperture has been selected. The circular plate is positively secured in any of its selected positions by simply tightening the nut 510 of the bolt 508. To assist this clamping action, a shaft 515 is inserted transversely in a channel extension of the base 500 directly below the plate 504. A clamp assembly 514 (Fig. 36) is mounted on the shaft 515 and bears on its rear surface a pair of ball headed studs 516 which cooperate with any pair of openings 516' which are provided in the peripheral flange section 504' of the circular plate 504. It will be obvious that the clamp assembly 514 will maintain the circular plate in any selected position when the studs 516 are drawn into cooperative position with the openings 516'. This is accomplished by transversely mounting a bolt shaft 518 in the clamp assembly to which is connected an eye bolt 517 adapted to extend rearwardly through a boss of the base 500 below the extruding chamber and which may be drawn tightly thereagainst by means of the usual nut. Thus the bolt 508 and the bolt 517 together securely clamp the circular plate 504 in proper position against the front face of the tapered section 502 to form a perfectly sealed joint therewith and thus prevent any leakage of dough between the front of casting 500 and the rear of section 502 and also between the front of the tapered section 502 and the rear of the circular plate 504.

It will be apparent that the circular plate 504 by means of its different diameters of tapered openings permits the extruding of lumps of dough of different diameters. In order to change from one diameter aperture to another, the drive of the extruding elements is stopped, the nuts on bolts 508 and 517 are loosened and the clamp 514 is moved forwardly so that the pair of studs 516 is withdrawn from the holes 516' of the circular plate. The plate 504 is now rotated manually on the bolt 508 until the desired aperture is in alignment with the aperture in the tapered section 502. The clamp 514 is now moved rearwardly so that its studs move into a new pair of the indexing holes 516' and the clamp proper bears against the face of the plate 504. The nuts on the bolts 508 and 517 are now tightened and as the indexing studs 516 have located the selected aperture in the plate 504 in perfect alignment with the extruding aperture the front end of the tapered section 502, the drive of extruding elements is started and will produce a diameter of extruded material corresponding to the size aperture chosen.

Suitable driving mechanism for the extruding elements is located beneath the gear housing portion of the base section 500. A front bearing plate 532 is secured at its upper end to the base section 500 and at its lower section to the legs 705 by means of spacing collars 541. A pair of horizontally extending posts 528 provided with shoulders and threaded stud ends and mounted on the plate 532 supports a rear bearing plate 533 which may be bolted thereto. A shaft 543 is supported in bearings suitably mounted in the upper portions of the bearing plates 532 and 533 and at its rear end supports a large roller chain sprocket 545 suitably keyed and bolted thereon. The front end of the shaft 543 has a driving gear 544 (Figs. 2 and 4) rigidly mounted thereon which meshes with the driving gear 522 of the right feed screw 503. A second drive shaft 551 is mounted in suitable bearings in the lower portions of the bearing plates 532 and 533. A small driving roller chain sprocket 554 is mounted on the rear end of the shaft 551 and has driving connection with the large roller chain sprocket 545 by means of the roller chain 550. A large driving belt pulley 553 is suitably keyed to the front end of the shaft 551 for connection with any suitable source of power. This power is obviously transmitted to the extruding screws 503 and 505 by means of the shaft 551, through the roller chain 550, the shaft 543 and the meshing gears 544 and 522.

Diagrammatically indicated (Figs. 2 and 4) is a slack adjusting means for the roller chain 550 which may take any suitable form such as an idler sprocket adjustably mounted on the rear side of the rear bearing plate 533 to apply pressure to the roller chain 550.

*The dough severing and feeding elements*

Referring to the Figures 1 to 5, 7 to 13, 17 and 18 and particularly to Figures 4, 5, 7 and 10 to 13, inclusive, it will be noted that many of the elements illustrated therein serve dual functions in that they assist in both the severing and feeding steps. Suitably mounted on the front channel section of the casting are a pair of vertically extending track members 564 each being provided with a T slot in each track with the open portions thereof facing each other. The tracks 564 are spaced apart a predetermined distance and are connected at their ends by the bracket 570 and the screws 572. A carriage which reciprocates vertically in the tracks 564 is constructed of a right side plate 588 and a left side plate 589 which are also spaced a predetermined distance apart by upper spacing rods 590 and lower spacing rods 591 which are rigidly connected thereto.

Four rollers 594 project and are spaced from the outer sides of the plates 588 and 589 at their upper and lower portions by means of collars 596 and are connected with the side plates by means of mounting screws 595 inserted through each roller 594 and its collar 596. The rollers 594 support the carriage in its vertical reciprocation and operate within and are guided by the T shaped slots in the tracks 564. A plate 598 for guiding severed rods of dough is mounted between the side plates 588 and 589 and on the lower carriage spacing rod 591 for a purpose which will become apparent.

Substantially centrally located on the plates 588 and 589 are a pair of shoulder bearings 599 which receive and support a square shaft 605 which has turned ends in order that these may be inserted within the bearings. An elongated hub or sleeve 617 having a square bore is mounted on the square shaft 605 and rigidly mounts at its ends a pair of triangular shaped plates 618. The square bored hub 617 and its integral triangular end plates 618 are supported by the shaft 605 midway between the carriage side plates 588 and 589.

Three wires 619 are drawn across and connect each pair of corner points of the triangular shaped plates 618 and are then bent inwardly toward the hub 617 to terminate in loops formed for the insertion therein of the screws 621 which anchor the ends of the wire. Intermediate the screws 621 and each of the corner points of the triangular plates are adjusting screws 622 (Fig. 8) mounted in threaded holes and being provided with circular seats in their outer ends to receive small shoes 623 for rotation therein. These shoes are provided with slots for receiving the respective wires and to prevent the wires being turned as the screws 622 are moved outwardly to adjustably tension the wires 619 by means of a screw driver inserted between the inner sides of the triangular plates.

It will be noted that the triangular plates form a cutting device having the three equally spaced cutting wires 619, one of which is always located to the rear of and in horizontal alignment with the center of the square shaft 605 and closely adjacent to the front machined surface of the circular plate 594. The cutter does not rotate on the downward movement of the carriage during the cutting operation. Accordingly rotation of the cutter must take place on the return or upward movement of the carriage (since the dough is being continuously extruded) to prevent a second undesired cutting by one of the wires 619.

The cutter is prevented from rotating during its downward or cutting stroke by means of a holding dog 613 mounted on the left side of the right carriage plate 588 (Figs. 6, 12 and 13) which engages a tooth of the ratchet gear 607 which is moutned on the square shaft 605 adjacent the plate 588. The holding dog 613 is held against the ratchet gear 607 by means of a spring 615 mounted on the frame 588 and connected to a lug integral with the dog 607.

The desired rotation of approximately 120 degrees of the cutter in its upward return movement to avoid an undesired cutting of the extruded material is accomplished by a cutter rotating dog 609 mounted by the shoulder rivet 610 to the right side of a gear segment 608 (Figs. 12–13). The gear segment 608 is assembled on a hub extension of the ratchet gear 607 adjacent its left side and between the right side of plate 618 and the left side of ratchet gear 607. The moving dog 609 is held against a tooth of the ratchet gear 607 by means of a spring 611 connected thereto and to the gear segment 608.

A rack mounting block 601 (Fig. 11) is connected to the rear surface of the right track 564 and supports three transversely extending studs 604 upon which a gear rack 603 is mounted. The teeth of the gear segments 608 are in alignment and mesh with the teeth of the gear rack 603. The rack 603 being fixed, reciprocation of the carriage in the track 564 causes oscillation or partial rotation of the gear segment 608. The length of the gear rack 603 is sufficient to effect a rotation of 120 degrees upon the gear segment 608 to effect a similar rotation of the cutter. The holding dog 613 engages the ratchet gear 607 at the completion of each one third revolution to restrain the cutter from rotating in reverse movement while severing the extruded dough in its downward movement.

Since the movement of the cutter is dependent on the holding dog 609 and the ratchet gear 607 which do not permit positive control, a friction brake is provided to prevent overrunning rotation of the cutter. The friction brake comprises a flanged sleeve like body 624 (Figs. 6, 7, 9 and 11) having a threaded end and a square axial bore for mounting on the square shaft 605 between the carriage plate 589 and the left side plate 618 of the cutter, the flanged end of the sleeve 624 being adjacent to the side 589. A brake shoe 625 is mounted on the sleeve 624 adjacent the flange and a washer 627 keyed thereto to prevent rotation thereon is mounted on the sleeve 624 adjacent the brake shoe 625. The tension spring 628 (Fig. 9), tension adjusting nut 629, and a lock nut 630 are next respectively mounted on the sleeve 624. The brake shoe 625 is provided with an opening at its lower end for engagement with a stud 626 which is riveted to the right side of the carriage plate 589 and the stud 626 prevents rotation of the brake shoe when the brake rotates with the square shaft 605. This arrangement of parts together with the adjustable tension provided by the spring 628 prevents any overrunning or excess rotation of the cutter.

If during the cutting or downward stroke of the cutter a rod of dough were to adhere to one of the cutting wires 619, the guard 598 (previously described) will cause its removal and direct the rod into a receiving bin 631 positioned therebelow. As each lump of dough is formed by severing the extruded dough and subsequently received in the bin 631, it is individually transferred and conveyed by the feeding mechanism to the rolling elements.

Referring now to Figures 1 to 6, 10, 11, 14 to 20 and particularly to Figs. 2, 6, 10, 14 and 15 it will be noted that the dough rod receiving bin 631 is mounted upon a transversely extending shaft 633 which is supported in suitable bearings formed on the extruding base section 500. Cam pieces 635 and 636 are rigidly mounted on the ends of the shaft 633 and are provided with hub members 637 which are rigidly attached to the ends of shaft 633.

The cam pieces 635 and 636 are each provided with cam slots of a shape which produce the required movement of the bin 631 through their operative relationship with main operating levers 640 and 641. Figs. 1–11, 14 and 19. When the extruded dough is severed the bin 631 assumes the position shown in full lines of Fig. 19 and when rotated clockwise approximately ⅛ of a revolution by means of the aforementioned operating relationship, it assumes the unloading position shown in broken lines of Fig. 19.

The operating levers 640 and 641 are rigidly mounted on a shaft 647 which is transversely and rotatably supported in a pair of bearings mounted at the front of the base of the extruding section 500. The levers 640 and 641 extend forwardly and have an operative connection with the outer sides of the cam pieces 635 and 636 by means of shouldered spring studs 644 having cam rollers 643 thereon, the studs being riveted to the inner sides of the levers and the rollers extending through the cam slots of cam pieces 635 and 636. Spring members 645 connected between the studs 644 and spring studs 639 retain the cam pieces 635 and 636 in proper relation with respect to the levers 640 and 641 so that the cam slots may effect the proper oscillating movements of the dough bin 631.

The operating movements of the levers 640 and 641 effect in turn the movements of both the feeding and the severing elements, these levers being in parallel alignment. An oscillating or partially rotary movement is transmitted to the arms 640 and 641 by a connecting rod 648 connected at its lower end to a crank 654 which is fixed to the drive shaft p-9 of the pretzel twisting and folding elements. The connecting rod 648 is provided with suitable bearings at its upper and lower ends and the crank 654 is provided with an adjusting hub portion 655 for its connection with the rod 648 at the shaft p-9 to permit the adjustment of the connecting rod 648 to obtain the proper synchronization in operation of the pretzel twisting and folding elements with respect to the severing and feeding elements.

The operating levers 640 and 641 are provided at their front ends with cam slots which cooperate with rollers 669 which are retained on the studs 668 by means of the flanged nuts 670. The shoulders of the bearings 599 extending outwardly from the carriage sides 588 and 589 provide a pivotal support for the arms 663 and 664 which are retained on the shoulder bearings 599 by suitable means. The pair of studs 671 (Fig. 5) are mounted on the upper front edges of the outer sides of the plates 588 and 589 to act as stop members for the arms 663 and 664 which carry between them a dough lump feeding platform 665 which is suitably secured thereto.

The block 601 which is mounted to the rear side of track 564 has mounted on its left side a gear rack 658 and a block 657 is attached to the rear side of the left rack 564 to support a left gear rack 658 (Figs. 10, 11, 14 and 15). The right and left gear racks 658 are in mesh with teeth which are provided on the rear ends of the arms 663 and 664 respectively. It will be noted that the racks 658 are provided with elongated vertical slots to permit their mounting to the blocks 601 and 657 and their vertical reciprocation during the operation of the mechanism.

In order to obtain the proper synchronized operation of the cutting and feeding elements, a predetermined amount of frictional resistance is arranged to retard their vertical reciprocatory movements. This friction device is mounted on the inner sides of blocks 601 and 657 (Figs. 16–18) in cooperative relationship in the following sequence. The racks 658, friction shoes 661, tension springs 659, and roller 660 mounted on the shoulder screw 662 which operates in the elongated slots of the racks 658 and is inserted through the above elements to screw tightly into the blocks 601 and 657.

A curved trough 576 is suspended between the receiving segment 711 of the rolling unit and a point (Figs. 14-15) of the base 500 below the center of the cutter. An end piece 577 which supports the lower rear end of the trough 576 is connected to the front end of the extruding base section 500 and the trough is attached at its upper end to brackets 573 and 574 (Fig. 11) which provides the connection between the upper end of the trough and the two forward extensions of the tie piece 570 of the tracks 564. The curvature of the trough 576 is such as to conform substantially to the arcuate path of the dough lump feeding platform 665 during operation thereof.

As the severed lumps of dough fall into the bottom of the trough 566, a movable stop 581, which is pivoted to the lower end of the trough, retains the dough lump in a position ready for feeding to the rolling elements. The dough rod stop 581 is integrally connected to a shaft 582 extending transversely and supported in bearing brackets 583 and 584 on the rear side of the end plate 577. The stop 581 pivots about the shaft 582 upwardly through a slot formed in the lower end of the trough 576 and is retained in its upward position by means of a spring 587 suitably connected thereto and to the trough. The stop 581 is moved downwardly by contact of the feeding platform 665.

As previously described it is highly important that the operating movements of the twisting and folding elements be accurately synchronized with respect to the movements of the severing and feeding mechanisms and accordingly the drive for the latter is obtained from the drive shaft of the twisting and folding elements. As also described, the connecting rod 648 which is connected to the operating levers 640 and 641 and the adjustable crank 654, moves upwardly and the levers 640 and 641 move counterclockwise about their shaft 647. At the same time the cam pieces 637 move clockwise about their shaft 633 and the bin 631 which holds a dough rod moves clockwise about shaft 633 until the angle of the bin is substantially 45 degrees at which time the dough lump rolls from the bin 631 into the bottom of the feeding trough 536. This action obviously takes place during the upward movement of the cutter carriage.

The dough lump rests in the bottom of the trough against the stop 581 and the trough acts as a guide and support in the feeding of the lump to the rolling elements, permitting it to slide as it is lifted upwardly. The dough lumps are lifted to the rolling elements by means of the feeding platform 665 which is supported in its movement on the swinging arms 663 and 664. The oscillating motion of the operating levers 640 and 641 swings the arms 663 and 664 by means of their rollers 669 and the engagement of the latter in the slots at the front ends of the operating levers 640 and 641. It will be apparent that the levers 663 and 664 also cause the vertical reciprocation of the cutter carriage through the gear rack 658.

Starting from the position shown in Fig. 14 the levers 640 and 641 and the arms 663 and 664 with the feeding platform 665 move clockwise about their axis the bearings 599 until the arms 663 and 664 contact the collars 596 and the platform 665 is in a vertical position. The meshing of the teeth of the segment arms 663 and 664 with the toothed racks 658, the latter being held in their elevated positions by the friction brake 661, causes the cutter carriage to move slowly downward. On the contacting of the segment arms 663 and 664 against the collars 596, the operating levers 640 and 641 continue downwardly overcoming the friction brakes 661 and forces the racks 658 to move downwardly also, together with the cutter carriage and its parts until the platform 665 contacts the stop 581 to push it flush with the bottom of the trough 576. The dough lump now rolls rearwardly against the front side of the platform 665 (Fig. 15) ready for feeding to the rolling elements, the bin 631 having moved counterclockwise on its shaft back to a horizontal position ready to receive another lump of dough.

*The dough rod rolling elements and operating parts*

Referring now to Figs. 1, 2, 4, 10, 14, 15 and 20 to 33, it will be seen that the rolling element assembly is supported in the frame composed of the structural members 702 and the connecting tie member 703. A pair of side plates 707 are secured by means of rivets 756 to the inner sides of the members 702 and rigidly support in turn a pair of ball-bearing housings 733. A second pair of plates 708 is adjustably mounted in contact with the plates 707 by means of bolts 754 which extend through arcuate slots in each and are retained therein by the nuts 755.

A rolling cylinder 709, preferably of metal, is mounted on a shaft 710 for rotation in the bearing housing 733, and is covered over its circumferential surface with a fabric cover 736, such as canvas, fastened thereto by suitable rivets or other means. A sprocket 782 is suitably keyed and fixed to the right end of the shaft 710 (Fig. 1) and engages an endless sprocket chain 786, to be operatively connected with a speed reducer sprocket 784 (to be described) to provide and synchronize rotation of the cylinder with the operation of the cutting and severing elements. The sprocket chain 786 may be provided with suitable slack adjusting means, not shown.

The rolling of the dough lumps is performed by the outer surface of the canvas covered cylinder 709 and the inner surface of a plurality of pivotally and adjustably connected segments mounted in spaced relation with respect to the rolling cylinder. The rolling segments, which may be of any desired number (for purposes of illustration we have shown seven) are preferably constructed of wood laminations which are suspended between the side plates 707 and arcuately about and spaced from the cylinder 709. All of the segments are equally spaced from the cylinder except the first two which are spaced a maximum where the lump of dough is received but decreasingly spaced so that the rear edge of the second segment aligns with the front edge of the third segment. The space between the cylinder 709 and the rolling segments may be adjusted for greater or less distance by rotatably adjusting the plates 708 with respect to the plates 707 as will be described.

The rolling segments, namely, 711 to 717, are provided with tie rods 718 for the purpose of securing together the wood laminations which are laterally enclosed in end plates 721—727. Attached to the rear end of each of the end plates 721—727 are the rear suspension plates 740 by means of the tie rods 718 and nuts 720. Similarly attached to the front ends of the end plates of the rolling segments are the front suspension plates 741 (Figs. 2, 21, 23 and 24). The suspension plates 740 and 741 which support the rolling segments in operative position act as hinged connecting means to each other.

Referring now to Fig. 24, it will be seen that the suspension plates 740 and 741 are provided with a hub portion 745 which is internally threaded for insertion of hinge screw 747. The screw includes a threaded section and a pilot, so that the threaded section will turn tightly within the threaded hub 745 and the pilot extend through reamed holes in the connecting plates 740 and 741 as a hinge pin. Each hinge screw 747 adjacent to its head has a shoulder for its proper insertion through one of the series of arcuate slots provided in the rolling unit supporting plates 707 and the rolling unit adjusting plates 708 to insure the suspension of the rolling segments in their proper positions with respect to the rolling cylinder 709.

As indicated above, the segment supporting plates 707 are provided with a series of slots conforming to the positions of the hinge screws 747 which extend therethrough and through slots in the adjusting plates 708, the latter plates having an adjustable relationship with the plates 707 which will be described. The individual segments are adjusted toward or away from the rolling cylinder 709 in accordance with the required diameter of the dough rod which is to be rolled. It will be noted that the arcuate slots in the adjusting plate 708 are angularly disposed with respect to the slots in the supporting plates 708 so that rotation of the adjusting plates 708 with respect to the plates 707 causes an inward or outward adjustment of the spacing of the individual rolling segments with respect to the rolling drum 709.

With particular reference to Figs. 25, 26 and 28 it will be observed that the contiguous series of arcuate segments (711 through 717) have their hinged connections and free ends so adjusted between plates 707 and 708 that the free end of segment 711 is anchored against movement circumferentially of the cylinder 709 while it is accommodated and guided in movement radially thereof. This result is obtained by reason of the radial direction of the slot of plate 707 at this point. The angular relations of each other overlapping pair of slots of plates 707 and 708 is such as to produce a predetermined compound movement toward and from the cylinder and circumferentially thereof. The amount of circumferential movement increases progressively toward the end segment 717 in order to accommodate contraction of the circular segment series. In this specific embodiment of the invention all of the hinged connections between the segments with the exception of the one between segments 711 and 712 will be uniform in their radial component of movement. The same is true of the connection at the free end of segment 717. In order to provide the initially tapering space between the segments and the cylinder, the hinged connection between segments 711 and 712 will be so guided as to maintain its proportionate spacing throughout the range of adjustment.

The rolling segments are most easily assembled by starting with the seventh segment 717 and positioning the same between the adjusting plates 708 with the tap threaded holes of the hinge plate hubs 745 in alignment with the respective slots of the adjusting plates 708 and the supporting plates 707, and inserting the screws 747 therethrough until the pilots of the screws are extended into the holes of the hinge plates 740 and 741 respectively. This procedure is followed with respect to each of the remaining segments in turn. Having assembled the seven segments 717 to 711 in the order mentioned, each is connected with its adjoining segment to provide an uninterrupted interior rolling surface continuous from the beginning of the segment 711 to the end of the segment 717. It is to be emphasized that the center of each of the hinge screws 747 is in substantial alignment with the rolling surface of the segments and their adjoining edges so that regardless of their adjusted positions the continuous rolling surface formed by the segments are substantially without any abrupt or detrimental changes which would have a damaging effect upon the finished or completely rolled dough rods.

The combined surface of the segments 711 to 716 are especially developed and include numerous herringbone corrugations angularly disposed with respect to the longitudinal axis of the combined segments to include an angle of substantially 60° therewith and the final segment 717 has a canvas-like fabric material 756 attached to its rolling surface to produce the final non-porous finish to the rolled rods of dough. An ejector 757 (Figs. 2, 21 and 22) supported by the ejector brackets 758 fastened to the inner sides of the plates 708, is mounted immediately adjacent the surface of the rolling cylinder 709 where the finished dough rod leaves the segment 717. The ejector 757 prevents the adherence of finished rods of dough to the rolling cylinder 709 on leaving the last rolling segment 717.

A dough rod guide plate 748 is hinged to the trailing edge of the last rolling segment 617 by means of a plurality of hinges 750. Springs 749 are connected to each end of the guide plate 748 and loop over a pair of the rolling segment tie rod nuts 720 to maintain the guide plate in its effective position against the mouth of a hopper to be described.

*The dough rod rolling unit adjustment mechanism*

Referring now to Figs. 1, 2, 4, 20 and 23 to 26, it will be seen that the adjusting plates 708 are provided with downwardly extending lug portions upon which are mounted threaded eye members 808 into which are inserted the adjusting screws 807. The adjusting screws extend rearwardly and mount at their rear ends the miter gears 811 (Fig. 2) adjacent a transversely extending shaft 806 supported by the frame side members 702. A pair of adjusting screw bearings are rigidly attached to the adjusting screw bearing brackets 818 which is mounted on the operating shaft 806 along the inner sides of the frame legs 702. The brackets 818 and their bearings support the rear ends of the adjusting screws 807 which are provided with suitable thrust collars located adjacent the front ends of the bearings 819. A miter gear 812 is suitably mounted on the shaft 806 adjacent the left side of the right adjusting screw bearing bracket and meshes with the miter gear 811 fixed to the right adjusting screw 807. A similar miter gear is mounted on the opposite end of the shaft 806 to mesh with the miter gear on the left adjusting screw. The hand wheel 802 (Fig. 2) is mounted on the extreme left end of the shaft 806 and is provided with a handle 803.

It will be apparent that manual operation of the hand wheel 802 by means of the handle 803 will rotate the shaft 806 and consequently the adjusting screws 807 by means of the miter gears 811 and 812, the two adjusting screws 807 being rotated simultaneously to the same extent. Thus the adjusting plates 708 are given a partial rotation with respect to the supporting plates 707 so that the rolling segments supported in the slots of each are simultaneously given an outwardly or inwardly adjusting movement of equal magnitude so that the relation of the rolling surfaces of the segments with respect to each other is always maintained regardless of the size of the dough rod for which the rolling elements are adjusted.

More specifically, when the hand wheel 802 is rotated clockwise, the right hand threads of these screws 807 engage with the threaded eye members 808 to cause a rearward movement of the extensions of the adjusting plates 708 about their axes (the shaft 719 of the rolling cylinder 709). The described movement of the adjusting plate 708 results in moving the rolling segments closer to the rolling drum 709 due to the action of the slots in the plates 708 and 707 on the hinge screws 747 to thus actually guide and retain the rolling segments in their proper relation with respect to each other. It will be apparent that the hand wheel 802 is turned in the opposite or a counterclockwise direction in order to produce a larger diameter of dough rods by increasing the spacing of each of the rolling segments from the surface of the rolling drum 709.

As previously described a dough rod on the completion of the rolling process is removed from the lower side of the drum 709 by the ejector 757 and is guided by means of the guide plate 748 into a hopper assembly which subsequently directs the finished dough rods into the twisting and folding elements. Referring now to Figs. 4 and 20, it will be noted that this hopper includes a front piece p–22 extending upward so that the guide plate 748 overlaps the same and is held thereagainst by the springs 749. This hopper has the usual sides and a pivotal rear side 768 which is mounted for pivotal movement on the hinges 769 so that it may also act as a deflector plate as will be described.

A second dough rod receiving bin 760 (Fig. 4) is located immediately to the rear of the previously described hopper and supported at its front edge on brackets attached to the rear side of the hopper piece p–21. The rear of the hopper 760 is supported by suitable brackets mounted on the structural member 702. The function of the second hopper 760 is to receive such dough rods as should be imperfectly formed during a starting period of the apparatus or perfectly formed dough rods if for any reason the twisting and folding elements are not capable of receiving them at the time. This is accomplished by use of the deflected plate 768 which is movable about its hinges 769 either to a position for guiding dough rods into the bin 760 or into a position for guiding the dough rods into the hopper p–22 mounted above the twisting and folding elements. The deflector plate 768 rests in an inclined position against the rear side of the guide plate 748 when the dough rods are to be directed into the bin 760. A spring 781 is connected to the lower end of the deflector plate 768 and to a spring stud attached to the right bracket p–27 and acts to retain the reflector plate in either of the two positions to which it may be moved.

Pretzel twisting and folding elements

The general construction and operation of the folding and twisting elements is covered by our prior Patent No. 2,161,267 issued June 6, 1939, therefore it will be necessary to describe only the improved elements thereof which operate to facilitate the synchronization of the elements in the various operations of our complete pretzel forming machine.

Referring now to Figures 1, 2 and 4 it will be noted that the pretzel twisting and folding elements are mounted on frame members which suspend the elements at a predetermined position above the top of the main structural side section 700 and directly below the rolling elements. The frame supporting the twisting and folding elements is supported by a plurality of leg members p–1' which rest on the main frame as shown. Mounted at the rear of the twisting and folding elements is the source of power therefor and also for the severing, feeding, and rolling elements, all of which may thus be very accurately synchronized in operation. A common geared speed reducing unit 821 is rigidly mounted adjacent the right end of the drive shaft p–9 to the top of the right rear corner of the structural base section 700. As seen in Fig. 2 the twisting and folding elements drive shaft p–9 and the shaft of the speed reducing unit 821 having operative clockwise rotation.

The shaft p–9 and the speed reducing unit 821 are connected by means of a clutch. Inasmuch as the specific structure of this clutch forms no part of the present invention it will be unnecessary to describe the same in detail. Suffice it to say that a clutch engaging member 678 is encircled by a clutch yoke handle 680 and clutch yoke piece 681. When the clutch yoke handle 680 is moved from left to right as seen in Fig. 1, the clutch engaging member 678 is engaged with the clutch driving member 675 mounted on the shaft of the speed reducer 821 to engage the clutch and provide the power for the twisting and folding elements drive shaft p–9. Obviously when the movement of the clutch yoke handle 680 is moved in the opposite direction the clutch engaging member 678 is out of engagement and the shaft of the speed reducer 821 has no operative effect upon shaft p–9.

The top end of the clutch yoke handle 680 engages with a slot of a clutch shifter 689 which, with the shifter extension piece 690, is located transversely and slidably in the structural side members of the extruder platform 704 (Fig. 2). Knobs 691 are mounted on the right end of shifter 689 and the left end of shifter extension 690 so that the shifter may be readily grasped to engage or disengage the clutch from either side of the pretzel forming machine.

A shaft extension 699 projects from the right side of the speed reducer 821 and has mounted thereon a chain driving sprocket 784 which is connected in driving relation by the roller chain 786 to the driven chain sprocket 782 on the shaft 710 of the rolling cylinder 709. A second shaft extension 692 extends rearwardly from the speed reducer 821 and is suitably supported in bearings 696 at its rear end. A driving pulley 694 is suitably keyed to the shaft 692 and may incorporate (not shown) an ordinary variable speed driving unit to obtain the various speeds required for each size of pretzel being formed, the driving pulley rotating in a clockwise manner during operation.

Operation of the elements of the pretzel forming machine

The operation of the various elements of our pretzel forming machine from the time of receiving the dough to the completion of the formed pretzel will now be described.

Suitable quantities of mixed dough are continuously fed to the hopper 506 which may be constructed with an outward taper in its bottom section to substantially eliminate any resistance to flow of the mass of dough moving into the extruding chamber. As the mass of dough moves into the extruding chamber it is fed toward the extruding orifice in the circular plate 504 by the pair of feed screws 503 and 505 which are rotating toward each other at a slow speed. The threads of the spiral feed screws are substantially 180° out of phase with each other to prevent any pulsating action of the mass of dough and to permit a smooth continuous flow through the twin cylinders of the extruding chamber. This smooth flow is facilitated by the specially developed inside taper of the twin cylinders surrounding the pair of feed screws which results in the dough being kneaded and compressed to improve the texture and build up a pressure sufficient for the subsequent extruding action.

The shape of the tapered end section 502 is such as to permit the continued smooth flow of the dough therethrough the opening in the front end of the tapered section 502 which is approximately ¼ the diameter of the entrance to the compressing or extruding chamber. It is important that the oppositely rotating feed screws 503 and 505 be rotated at slow speeds to insure the absence of friction heat in the extruded dough which would result from high speeds and cause what is known as "hot" or "burnt" dough, a highly detrimental condition with respect to the subsequently formed dough rods.

The dough is next forced through the selected aperture of the circular plate 504 in a continuous length of uniform diameter and at a speed which is controlled entirely by the rotational speed of the feed screws 503 and 505 and the diameter of the select aperture of the circular plate 504.

Assuming that the apparatus is adjusted for the forming of small thin pretzels, it will be apparent that the single change comprising the use of a larger size extruding orifice will result in large thin rolled pretzel rods. If the rolling segments be now spaced further from the rolling cylinder, the same extruding orifice will produce small thick rolled pretzel rods which can be enlarged by the use of a larger orifice. Obviously an increase in the speed of the extruding worms within safe limits will have the same effect as increasing the size of the extruding orifice and vice versa.

The extruded dough is intermittently severed into predetermined lengths dependent upon the speed of the feed screws 503 and 505 and the speed of the vertical reciprocation of the carriage which supports the cutter and its three cutting wires 619 in this movement on the vertical tracks 564. The cutter does not rotate when severing the dough but only during the upward movement of the supporting carriage at which time the cutting wires are indexed ⅓ of a revolution. The cutter is always at the upper limit of the reciprocating movement immediately prior to the start of the severing operation and one of the cutting wires thereon is positioned adjacent the circular plate 504 in horizontal alignment with the cutter shaft 605, this position being retained by the holding dog 613 on the carriage side which engages a tooth of the ratchet gear 607 (Fig. 12). The holding dog 613 prevents clockwise rotation of the cutter during its downward movement and counterclockwise rotation is prevented by the resistance of the extruded dough to one of the cutter wires 619 during the cutting operation. (Fig. 10 shows the cutter in position immediately prior to the cutting operation.) As each dough lump is severed from the dough being extruded it drops by gravity into the small bin 631 positioned on the shaft 633 adjacent the front side of the circular plate 504 beneath the cutter until it is rotated toward the trough 576 by the feeding mechanism. The indexing of the cutter and its three wires 619 immediately after the cutting operation prevents its interfering with the dough being extruded on the upward movement of the carriage which is thus synchronized so that the extruded dough is only contacted by the cutting wires on the downward cutting stroke.

The cutter derives its indexing movement from the vertical reciprocatory movement of the carriage and associated parts in the two tracks 564. Figs. 12 and 13 show the details of the indexing mechanism at the upper and lower extremes of the vertical reciprocatory movement of the cutter respectively. The ratchet gear 607 rotates with its square shaft 605 and its three ratchet teeth, which engage in turn with the holding dog 613, prevent rotation of the cutter during its downward movement. These teeth also provide the indexing movement of the cutter ⅓ of a revolution counterclockwise during the upward movement of the carriage. The gear segment 608 mounted on a hub extending from the left side of the gear 607 is rotated by the engagement of its teeth with that of the rack 603 during the vertical movement. The rack 603 is fixed by reason of its being riveted to the post 604 and the indexing dog 609 suitably mounted on the right side of segment 608 is retained in engagement with the teeth of ratchet gear 607 by means of the tension springs 611.

When the carriage moves downwardly, causing one of the three wires 619 to pass through and sever the extruded dough, the gear segment 608 being engaged with the rack 603 rotates in a clockwise direction on the hub of the ratchet gear 607 until the indexing dog 609 has moved out of engagement with one tooth on the gear 607 and into engagement with another tooth. This is a rotation of 120° from the position in Fig. 12 to the position shown in Fig. 13.

On upward movement of the carriage, during which time the extruded dough is not severed, the gear segment 608 being engaged with gear rack 603 rotates in a counterclockwise direction and, since the dog 609 now engages a tooth of the ratchet gear 607 the gear segment 608, the indexing dog 609, the ratchet gear 607 and the square cutter shaft 605 and the cutter comprising the hub 617, sides 618 and cutting wires 619, all also move simultaneously 120° to place a second wire 619 in cutting position.

As the above motion is taking place, the holding dog 613 disengages from one tooth of the ratchet gear 607 and engages another tooth preparatory to holding the cutter from rotation during the next or succeeding cutting operation. This movement, which is equal to one-third of a revolution of the gear segment 608, is from the position shown in Fig. 13 to the position shown in Fig. 12. Thus, with each upward movement of the carriage, the cutter is rotated counterclockwise one-third of a revolution to prevent any interference by the wire 619 which has just passed through the extruded dough. Thus, the cutter is held in cutting position by the holding dog 613 while the segment 608 rotates one-third of a revolution clockwise to permit the indexing dog 609 to select another tooth of the ratchet gear 607 preparatory to moving another cutting wire 619 into its position for the following severing cycle.

To prevent any overrunning movement of the cutter beyond its normal position due to its momentum during the indexing action, a friction brake (see Figs. 7 and 9) composed of the body 624, the washer 627, spring 628, and the nuts 629 and 630, all located on the cutter shaft 605 to the left of the cutter, rotates with the cutter while a brake shoe 625 on the brake body 624 is held rigidly by the holding stud 626 in the carriage side 589. This frictional resistance between the flange of the body 624 and the washer 627 upon the shoe 625 is due to the pressure of the tension spring 628 (see Fig. 9) which is adjustable by means of the nuts 629 and 630. The frictional resistance thus set up will eliminate any tendency of the cutter to overrun its proper operative position.

As has been previously mentioned the severed lumps of dough fall into the bin 631 which is constructed and arranged to be rotated clockwise about its shaft 633 until it assumes an angle of substantially 45° from the horizontal, causing the dough lump to roll out of the bin 621 (Fig. 14) into the bottom of the feeding trough 576. This action takes place during the upward movement of the cutter carriage. The movable stop 581, which is provided in the bottom of the feeding trough 576 at its lower end, retains the severed dough lump in a position from whence it is fed to the rolling elements.

The dough lump feeding platform 665 has a motion corresponding to the curvature of the feeding trough as it moves from its position as shown in Fig. 15 to the position illustrated in Fig. 10. It will be recalled that the platform 665 is supported in its movements on the swinging arms 663, 664, which are operated by the operating arms 640 and 641 which receive their motion in turn from the connecting rod 648.

As seen in Fig. 14, the dough lump about to be fed by feeding platform 665 to the rolling element assumes the position shown against the stop 581. The downward movement of the operating levers 640 and 641 effects a clockwise rotation of the segment arms 663 and 664 with the feeding platform 665 about their bearing axis 599 until the segment arms contact the collars 596 and the platform 665 has assumed a vertical position.

During this rotation the teeth of the arms 663 and 664 roll along the racks 658 which are being held in their upper positions by the friction brake 661 to cause the cutter carriage to move downward slowly. On the contacting of the arms 663 against the collars 596, the operating levers 640 and 641 continue their downward motion and overcome the friction which has been retaining the racks 658 in their upper positions and force them downwardly together with the cutter carriage and all its parts, until the feed platform 661 contacts the stop 581. The stop is thus pushed flush with the bottom of the trough 576, permitting the lump of dough to roll rearwardly against the front side of the feeding platform (Fig. 15). During the above movement of the various elements, one of the wires 619 is again severing the succeeding lump of dough, which in turn falls into the bin 631 which has now been rotated counterclockwise on its shafts 633 back to the horizontal or normal dough lump receiving position.

The feeding of the lump of dough to the rolling elements is effected by upward movement of the operating arms 640 and 641, the segment arms 663 and 664, and the feeding platform 665 moving in counterclockwise direction until the arms 663 and 664 contact the stop pins 671. The platform 665 is now in a horizontal position and during this movement the teeth of the segment arms 663 and 664 have rolled in the racks 658, which are being held in their lower positions by their friction brakes 661, to effect a slow upward movement of the cutter carriage. Upon rotation of the segment arms about their stopped position, the operating elements 640 and 641 continue their upward movement, overcoming the friction which has been retaining the racks 658 in their lower positions and force them upwardly together with the cutter carriage and all of its parts until the feeding platform contacts the lower edge of the rolling segment 711 to feed the lump of dough thereto. During the above movement, the dough bin 631 rotates clockwise to empty the succeeding dough lump into the bottom of the trough 576 and the cutter rotates 1/3 of a revolution in a counterclockwise direction to position the succeeding cutting wire ready for its next cutting operation.

It will be noted that the first rolling segment 711 is cut away as at 711' to receive and center the lump of dough in the space between the rolling cylinder 709 and the rolling segment 711. As the lump of dough is passed into the opening between the lower edge of the segment 711 and the rolling cylinder, it is contacted by the canvas surface of the latter and drawn by its clockwise rotation into the space between it and the rolling segments. The lump of dough is thus rolled between the cylinder 709 and the respective inner surfaces of the rolling segments 711 to 717 (Fig. 20), the fabric surface of the rolling cylinder 709 being entirely responsible for the rolling motion of the lump of dough.

The first segment 711 and the second 712, are positioned so as to provide a rolling space which gradually decreases in size so that the spacing at the commencement of the third segment 713 is substantially equal to the diameter of the finished dough rod. As clearly illustrated in Fig. 29, the rolling surfaces of the first five segments are provided with corrugations that continue from one segment to the other and result in spreading the lump of dough from its center toward its ends. The corrugations include, with respect to the central longitudinal line, an angle of substantially 15°. The rolling surface of the sixth segment, 716, is provided with much finer corrugations, which provide an increased compressing action on the lump of dough as the dough is finally distributed and rolled, and these corrugations include with respect to a longitudinal central line an angle of substantially 45°. The rolling surface of the seventh and last segment, 717, is provided with a fabric surface 766, which produces a finished surface and final sizing operation upon the rolled dough rod. The progressive shapes of the lump of dough as it is rolled are illustrated in Figs. 30 to 33, inclusive.

It will be noted that, due to the hinged connections of the seven rolling segments, their inner rolling surfaces form a substantially unbroken single rolling surface regardless of the spacing adjustment between the segments and the rolling cylinder. This continuous inner rolling surface with its corrugations are entirely responsive for the reduction of the lump of dough into a finished long rod with the least resistance and without any detrimental effects on the texture of the dough. Two rotations of the rolling cylinder are required to carry the dough rod from the first to the last rolling segment and in the event a finished dough rod should adhere to the fabric surface of the rolling cylinder, the knife edge scraper 757 will effect its removal onto the guide plate 748 and into the hopper p–22. The removing action of the scraper 757 also provides a straightening operation upon the dough rod to facilitate the uninterrupted feeding of the dough rods into the twisting and folding elements, which are positioned therebelow.

If the finished dough rods are of the correct length and diameter required for the size of pretzel being produced, the dough rod deflector plate 768 is moved rearwardly against the stop bracket 778 to guide the dough rods into the hopper which delivered them to the twisting and folding elements to be formed into the finished pretzel. If the dough rods are unacceptable in length or diameter for the forming operation, the deflector plate 768 is moved forwardly against the guide plate 748 to guide the dough rods into the receiving bin 760 where they may be removed at suitable intervals and replaced in the extruding unit hopper 506 for reprocessing. The speed of the rolling cylinder 709 is synchronized with the cycle of operation of the twisting and folding elements so that the rolling of the dough rods conforms with the requirements thereof.

It will now be seen that the pretzel twisting and folding elements, the rolling elements, the feeding and severing elements are all closely related in their operating movements and therefore are synchronized to receive their motive power from a single source through the driving pulley 694, which may be driven by a belt engaged with a common adjustable variable speed power element. The adjustable variable speed is very important in order to obtain the correct speed that is permissible or required for the respective size of pretzel being formed.

The extruding elements are operated and receive their motive power from a single source of power through the driving pulley 553, which may be driven by a belt engaged with a common adjustable variable speed power element. The adjustable variable speed is very important since the operating speed is responsible for the quantity and quality of dough extruded, therefore, the adjustable speed permits the extruding of the correct amount of dough which must correspond to the respective sizes and quantities of pretzels being fabricated.

Aside from the unique principle of extruding and rolling a dough rod, we have also included in our invention, very practical and simple methods of adjustment which, when manually operated, are instrumental in a unified adjustment of all elements which require adjustment when changing from the making of one size dough rod to a different size. The time necessary for these adjustments is negligible, and do not require skilled labor, which is an important feature of our invention, and very acceptable to the pretzel trade.

The action of the severing and feeding mechanisms are identical regardless of the sizes of pretzels being produced, and no adjustments are required. It is apparent that the proper operation of one mechanism is dependent on the operation of the other since they are so interrelated in their synchronized actions that the severing mechanism is entirely dependent on the feeding mechanism for imparting the proper movements of its carriage.

It is common knowledge to those persons familiar with the characteristics of mixed dough that when it is left standing for any length of time without the taking of precautions to control its temperature and the humidity of the atmosphere surrounding it, a change in the dough takes place which is detrimental to its further use for the purposes intended. Therefore, it is very important that any mixed dough remaining in the unit be removed. To accomplish this, the extruding elements may readily be partially disassembled with a minimum of effort so that all parts which were in contact with the dough can be removed, properly cleaned and reassembled again for operation. Otherwise, the dough remaining in the machine would become hard and freeze the two feed screws 503 and 505 to prevent further operation of the machine.

It will now be apparent that the improved apparatus comprising our present invention includes many novel features which cooperate to produce a superior, perfectly formed pretzel free from air holes and even, non-porous in texture so as to absorb a minimum of the dipping solution used for browning. Moreover, the pretzel forming machine is extremely flexible in its production of the various sized pretzels now found essential by the industry.

It is to be understood that the form of the invention shown herewith and described is to be taken as a preferred example of the same and that various changes in the shape, size, and arrangement of parts may be resorted to without departure from the spirit of the invention or the scope of the subjoined claims.

We claim:

1. In a machine of the type described, dough lump rolling means comprising a frame, a pair of spaced bearings mounted in said frame and rotatably supporting a shaft therebetween, a cylinder fixed to said shaft, a series of hingedly connected and contiguous arcuate segments supported on said frame and partially encircling the cylinder and spaced therefrom, whereby a dough lump may be rolled into rod shape between the inner surface of said connected segments and said cylinder upon rotation of the latter, means for simultaneously adjusting the respective distances of the hinged connections from the cylinder, and means operatively connected with said shaft to effect rotation of said cylinder.

2. In a machine of the type described, dough lump rolling means comprising a frame, a pair of spaced bearings on said frame and rotatably supporting a shaft therebetween, a cylinder fixed to said shaft, a contiguous series of hingedly connected arcuate segments supported on said frame and partially encircling the cylinder and spaced therefrom, whereby a dough lump may be rolled into rod shape between the inner surface of said connected segments and said cylinder upon rotation of the latter, means operatively connected with said shaft to effect rotation of said cylinder, the first several of said segments with respect to the direction of rotation of said cylinder being so spaced therefrom as to enclose therewith a space tapering gradually from the leading edge of the first segment to the leading edge of an intermediate segment, and means for simultaneously adjusting the respective distances of the hinged connections from the cylinder while anchoring the first segment against circumferential movement relative thereto.

3. In a pretzel forming machine, a supporting frame, dough rolling means comprising a rotatable cylinder mounted on said frame, a contiguous series of hingedly connected arcuate segments of wood positioned partially around and spaced from said cylinder whereby a lump of severed dough may be rolled into rod shape between said segments and said cylinder upon rotation of the latter, and means for simultaneously adjusting said hinged connections in constantly proportionate amounts toward or away from said cylinder to vary the size of the rolled dough rods.

4. In a pretzel forming machine including a supporting frame, dough rolling means comprising a rotatable cylinder mounted on said frame, a contiguous series of hingedly connected rigid arcuate segments positioned partially around and spaced from said cylinder whereby a lump of severed dough may be rolled into rod shape between said segments and said cylinder upon rotation of the latter, the inner surfaces of at least some of said segments being formed with corrugations to assist in the spreading and rolling of said lumps, and means for simultaneously adjusting the respective distances of the hinged connections from the cylinder.

5. In a pretzel forming machine, dough rolling means comprising a frame, a cylinder rotatably mounted on said frame, a series of hingedly connected and contiguous arcuate segments mounted on said frame and partially encircling the cylinder in spaced relation thereto, the segment at one end of the series being secured against movement circumferentially of the cylinder, and means for adjusting the respective distances of the hinged connections from the cylinder.

6. In a pretzel forming machine including a supporting frame, adjustable dough rolling means comprising a rotatable cylinder mounted on said frame, a contiguous series of hingedly connected rigid arcuate segments positioned partially around and spaced from said cylinder whereby a lump of severed dough may be rolled into rod shape between said segments and said cylinder upon rotation of the latter, said arcuate segments having the axes of their hinged connections aligned with respective adjacent pairs of segment edges and being so supported that their inner surfaces form together a substantially single and continuous rolling surface, and means for simultaneously adjusting the respective distances of the hinged connections from the cylinder.

7. In a dough lump forming machine, the combination comprising frame means, a cylinder rotatably supported by said frame means, a contiguous series of hingedly connected arcuate segments adapted to partially encircle the cylinder, and an adjustable device supporting said series of segments in spaced encircling relation to said cylinder and varying said spacing, said adjustable device including means for securing the unhinged end of the segment at one end of the series against movement circumferentially of the cylinder while accommodating and guiding adjusting movement radially thereof, and other means guiding each hinged connection and the unhinged end at the other end of the series in a predetermined compound movement toward and from the cylinder and circumferentially thereof.

8. The combination of claim 7 including members for simultaneously operating said adjusting means and guiding means.

9. A dough lump rolling machine comprising a frame providing a spaced pair of bearing supports, a cylinder mounted for rotation in said supports, a fixed side plate adjacent each end of the cylinder, each of said side plates being formed with a plurality of spaced projections extending beyond the peripheral surface of the cylinder with each projection having a slot therein, an adjustable side plate mounted for rotation relative each fixed side plate and having a plurality of projecting lugs each having a slot therein and spaced similarly to said projections for movement thereover, a pin member extending through each overlapping pair of slots, the slots of each pair being arranged angularly to each other to cause a predetermined movement of their pin member toward or away from the surface of said cylinder in response to rotation of said adjustable side plate, a series of arcuate segments partially encircling the cylinder in spaced relation and supported and hingedly connected at their adjacent ends by means including pin members, and members connected with said adjustable side plates for moving said pin members and the arcuate segments connected therewith toward or away from the cylinder.

10. A pretzel forming machine comprising a frame providing a spaced pair of bearing supports, a cylinder mounted for rotation in said supports, a fixed side plate adjacent each end of the cylinder, each of said side plates being formed with a plurality of spaced projections extending beyond the peripheral surface of the cylinder with each projection having a slot therein, an adjustable side plate mounted for rotation relative each fixed side plate and having a plurality of projecting lugs each having a slot therein and spaced similarly to said projections for movement thereover, a pin member extending through each overlapping pair of slots, the slots of each pair being arranged angularly to each other to cause a predetermined movement of their pin member toward or away from the surface of said cylinder in response to rotation of said adjustable side plate, a contiguous series of rigid arcuate segments partially encircling the cylinder in spaced relation and supported and hingedly connected at their adjacent ends by means including said pin members, the axes of said pin members being substantially coincident with the forming surface of the segments, and adjustable members connected with said frame and said adjustable side plates for moving said pin members and the arcuate segments connected therewith toward or away from the cylinder.

WILLIAM M. YOUNG.
LEMON BLAIR PAULES.

REFERENCES CITED

The following references are of record in the file of this patent:

UNITED STATES PATENTS

| Number | Name | Date |
|---|---|---|
| 7,797 | Driscoll | Nov. 19, 1833 |
| 155,602 | Wiegand | Oct. 6, 1874 |
| 498,206 | Denbeigh | May 23, 1893 |
| 1,116,766 | Uhler | Nov. 10, 1914 |
| 1,127,967 | Davis et al. | Feb. 9, 1915 |
| 1,818,945 | Dell | Aug. 11, 1931 |
| 2,026,526 | Gipe | Jan. 7, 1936 |
| 2,053,608 | Gerland | Sept. 8, 1936 |
| 2,099,119 | King et al. | Nov. 16, 1937 |
| 2,146,846 | Plambeck | Feb. 14, 1939 |
| 2,206,312 | Werner | July 2, 1940 |
| 2,232,832 | Walborn | Feb. 25, 1941 |
| 2,249,307 | Battiste | July 15, 1941 |
| 2,295,246 | Weida | Sept. 8, 1942 |

FOREIGN PATENTS

| Number | Country | Date |
|---|---|---|
| 350,910 | Great Britain | June 15, 1931 |
| 511,941 | Germany | Nov. 10, 1930 |
| 580,925 | Germany | July 18, 1933 |